US012750452B2

(12) United States Patent
Sawada et al.

(10) Patent No.: US 12,750,452 B2
(45) Date of Patent: Sep. 29, 2026

(54) OPTICAL DEVICE, IMAGE READING UNIT, AND IMAGE FORMING APPARATUS CORRECTING A WIDTH OF A SLIT FOR REFLECTED LIGHT

(71) Applicant: FUJIFILM Business Innovation Corp., Tokyo (JP)

(72) Inventors: Hiroshi Sawada, Kanagawa (JP); Kazuo Matsumae, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 366 days.

(21) Appl. No.: 18/364,096

(22) Filed: Aug. 2, 2023

(65) Prior Publication Data

US 2024/0283881 A1 Aug. 22, 2024

(30) Foreign Application Priority Data

Feb. 17, 2023 (JP) ................................ 2023-023608

(51) Int. Cl.
*H04N 1/028* (2006.01)
*G02B 3/00* (2006.01)
*H04N 1/03* (2006.01)

(52) U.S. Cl.
CPC ....... *H04N 1/02885* (2013.01); *G02B 3/0062* (2013.01); *G02B 3/0075* (2013.01); *H04N 1/02835* (2013.01); *H04N 1/0284* (2013.01); *H04N 1/0306* (2013.01)

(58) Field of Classification Search
CPC ........... H04N 1/02885; H04N 1/02835; H04N 1/0284; H04N 1/0306; G02B 3/0062; G02B 3/0075
See application file for complete search history.

(56) References Cited

U.S. PATENT DOCUMENTS

2011/0134495 A1* 6/2011 Nagata .................. G02B 13/26 359/622
2017/0346987 A1* 11/2017 Ouchi ................ H04N 1/40056
2018/0246258 A1* 8/2018 Shiraiwa .......... B29D 11/00307
2019/0373147 A1* 12/2019 Yamamoto ............. H04N 23/55
2021/0029265 A1* 1/2021 Asano .................. G02B 3/0062

FOREIGN PATENT DOCUMENTS

JP 2007-043360 A 2/2007

* cited by examiner

*Primary Examiner* — Nicholas Pachol
(74) *Attorney, Agent, or Firm* — Sughrue Mion, PLLC

(57) ABSTRACT

An optical device includes: a restriction member that restricts part of reflected light from a target object, the restriction member being formed from resin, the restriction member having an opening and a hole, the opening extending in a first direction crossing a propagation direction of the reflected light and formed at an upstream end in the propagation direction, the hole extending through the restriction member in the propagation direction; an optical member that transmits the reflected light that has passed through the opening; and a correction member that holds the optical member, and that comes into contact with part of an inner circumferential surface of the hole to correct a width of the opening.

19 Claims, 30 Drawing Sheets

OPTICAL DEVICE, IMAGE READING UNIT, AND IMAGE FORMING APPARATUS CORRECTING A WIDTH OF A SLIT FOR REFLECTED LIGHT

CROSS-REFERENCE TO RELATED APPLICATIONS

This application is based on and claims priority under 35 USC 119 from Japanese Patent Application No. 2023-023608 filed Feb. 17, 2023.

BACKGROUND

(i) Technical Field

The present disclosure relates to an optical device, an image reading unit, and an image forming apparatus.

(ii) Related Art

Japanese Unexamined Patent Application Publication No. 2007-43360 describes an image sensor having a structure including a rodlike light source that irradiates a to-be-read image with light, a slitted hood that captures light reflected off the to-be-read image through a slit, an image-forming optical system that converges light that has passed through the slit, and a light receiving element that receives light that has passed through the image-forming optical system, and a housing that accommodates the light source, the slitted hood, the image-forming optical system, and the light receiving element. A thin metal hood is used as the slitted hood.

SUMMARY

An optical device includes a restriction member and a holding member. The restriction member includes an opening that extends in one direction, and that allows part of reflected light reflected off a target object to pass through it while restricting the other part of the reflected light. The holding member holds an optical member that extends in one direction and that transmits the reflected light that has passed through the opening.

When the restriction member having the opening extending in one direction is formed from a resin material, the opening may have its width ("opening width", below) at a center portion in one direction narrower than the opening width at end portions in the direction due to, for example, die shrinkage.

Aspects of non-limiting embodiments of the present disclosure relate to reduction of narrowing the opening width at the center portion in one direction with respect to the opening width at end portions in the direction compared to a case where a restriction member and a holding member that holds an optical member come into contact with each other simply in a direction in which reflected light propagates.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

An optical device according to a first aspect of the present disclosure includes: a restriction member that restricts part of reflected light from a target object, the restriction member being formed from resin, the restriction member having an opening and a hole, the opening extending in a first direction crossing a propagation direction of the reflected light and formed at an upstream end in the propagation direction, the hole extending through the restriction member in the propagation direction; an optical member that transmits the reflected light that has passed through the opening; and a correction member that holds the optical member, and that comes into contact with part of an inner circumferential surface of the hole to correct a width of the opening.

BRIEF DESCRIPTION OF THE DRAWINGS

Exemplary embodiments of the present disclosure will be described in detail based on the following figures, wherein.

DETAILED DESCRIPTION

Figure 1:
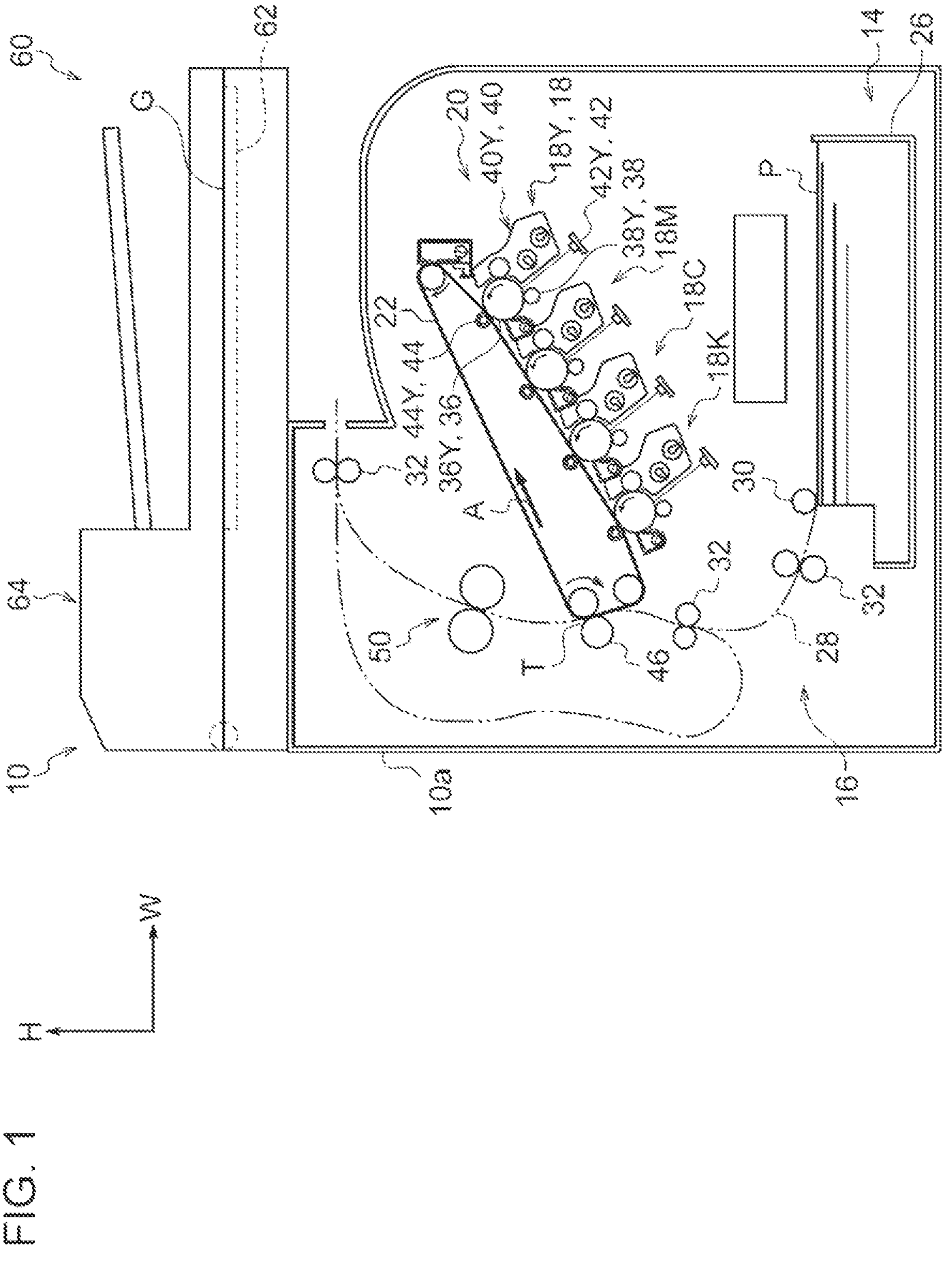
FIG. 1 is a schematic diagram of an image forming apparatus according to an exemplary embodiment of the present disclosure.

Examples of an image reading device, an image reading unit, and an image forming apparatus according to an exemplary embodiment of the present disclosure are described with reference to FIG. 1 to FIG. 30B. First, an image forming apparatus 10 including an optical device and an image reading unit is described.

In the drawings, arrow H indicates an apparatus height direction (vertical direction), arrow W indicates an apparatus width direction (horizontal direction), and arrow D indicates an apparatus depth direction (horizontal direction). The apparatus height direction, the apparatus width direction, and the apparatus depth direction are perpendicular to each other. The apparatus height direction may be described as a height direction.

Entire Structure of Image Forming Apparatus 10

As illustrated in FIG. 1, the image forming apparatus 10 according to the present exemplary embodiment includes a container 14 that accommodates sheet members P serving as recording media, a transport portion 16 that transports the sheet members P accommodated in the container 14, an image forming portion 20 that forms images on the sheet members P transported by the transport portion 16 from the container 14, and an image reading unit 60 that reads images formed on a document G. These components are arranged in this order from below to above in the height direction (arrow H direction).

Container 14

The container 14 includes a container member 26 that is drawable out to the front in the apparatus depth direction from a housing 10*a* of the image forming apparatus 10. The container member 26 receives a stack of the sheet members P. The container 14 includes a pick-up roller 30 that dispatches the uppermost one of the sheet members P stacked on the container member 26 to a transport path 28 for the sheet members P.

Transport Portion 16

The transport portion 16 includes multiple transport rollers 32 that transport the sheet members P along the transport path 28.

Image Forming Portion 20

The image forming portion 20 includes four image forming units 18Y, 18M, 18C, and 18K for yellow (Y), magenta (M), cyan (C), and black (K), respectively. In the following description, the reference signs may be described without Y, M, C, and K when the colors Y, M, C, K are not to be distinguished from one another.

An image forming unit 18 for each color is attachable to and removable from the housing 10*a*. The image forming unit 18 for each color includes an image carrier 36, a charging roller 38 that electrically charges the surface of the image carrier 36, and an exposure device 42 that emits exposure light to the electrically charged image carrier 36.

The image forming unit 18 for each color also includes a development device 40 that develops an electrostatic latent image formed by the exposure device 42 exposing the electrically charged image carrier 36 to light, into a visible toner image.

The image forming portion 20 also includes an endless transfer belt 22 that rotates in the direction of arrow A in the drawing, and first transfer rollers 44 that each transfer the toner image formed by the image forming unit 18 for the corresponding color to the transfer belt 22. The image forming portion 20 also includes a second transfer roller 46 that transfers the toner images transferred to the transfer belt 22 to the sheet members P, and a fixing device 50 that fixes the toner images to the sheet members P by heating and pressing the sheet members P to which the toner images are transferred. The second transfer roller 46 is an example of a transfer device.

Image Reading Unit 60

Figure 2:
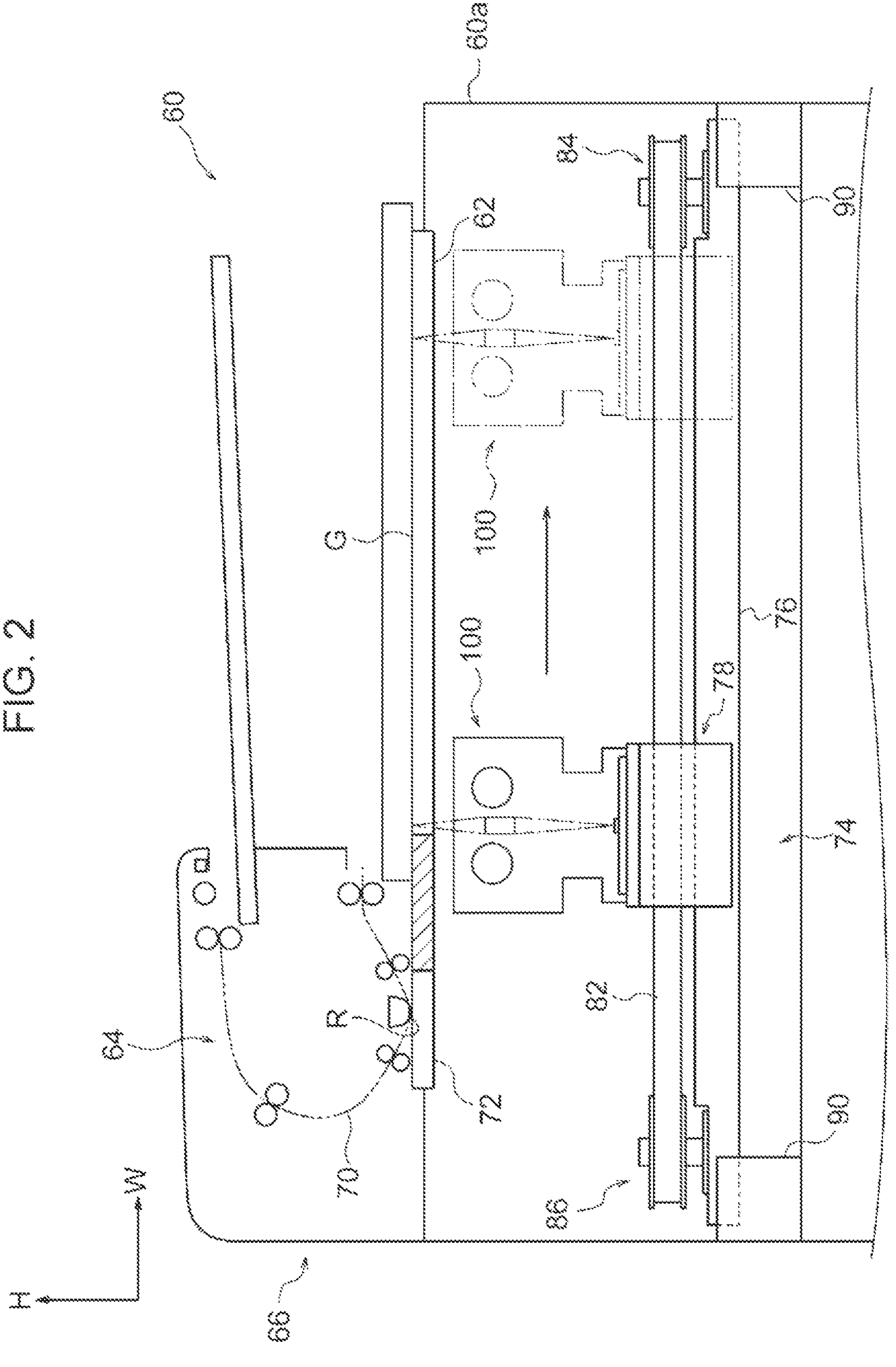
FIG. 2 is a schematic diagram of an image reading unit according to an exemplary embodiment of the present disclosure.

As illustrated in FIG. 2, the image reading unit 60 includes a first transparent plate 62 (so-called platen glass) that receives the document G to read an image on the document G, and a second transparent plate 72 disposed on one side (left side in the drawing) of the first transparent plate 62 in the apparatus width direction. The first transparent plate 62 and the second transparent plate 72 are fitted to an upper portion of a housing 60*a* of the image reading unit 60. The first transparent plate 62 is an example of a glass plate.

Above the first transparent plate 62 and the second transparent plate 72, an open/close cover 66 that opens or closes the first transparent plate 62 and the second transparent plate 72 is disposed. The open/close cover 66 accommodates a transport device 64 (that is, an automatic document feeder (ADF)) that transports multiple documents G along a transport path 70 in the open/close cover 66 and allows the documents G to pass a document read position R above the second transparent plate 72.

The housing 60*a* accommodates an image reading device 100 that reads an image on the document G placed on the first transparent plate 62 and an image on the document G transported by the transport device 64 to the document read position R. The image reading unit 60 includes a driving device 74 that drives the image reading device 100 in the apparatus width direction. The image reading device 100 is an example of an optical device. The image reading device 100 is described below in detail.

Figure 3:
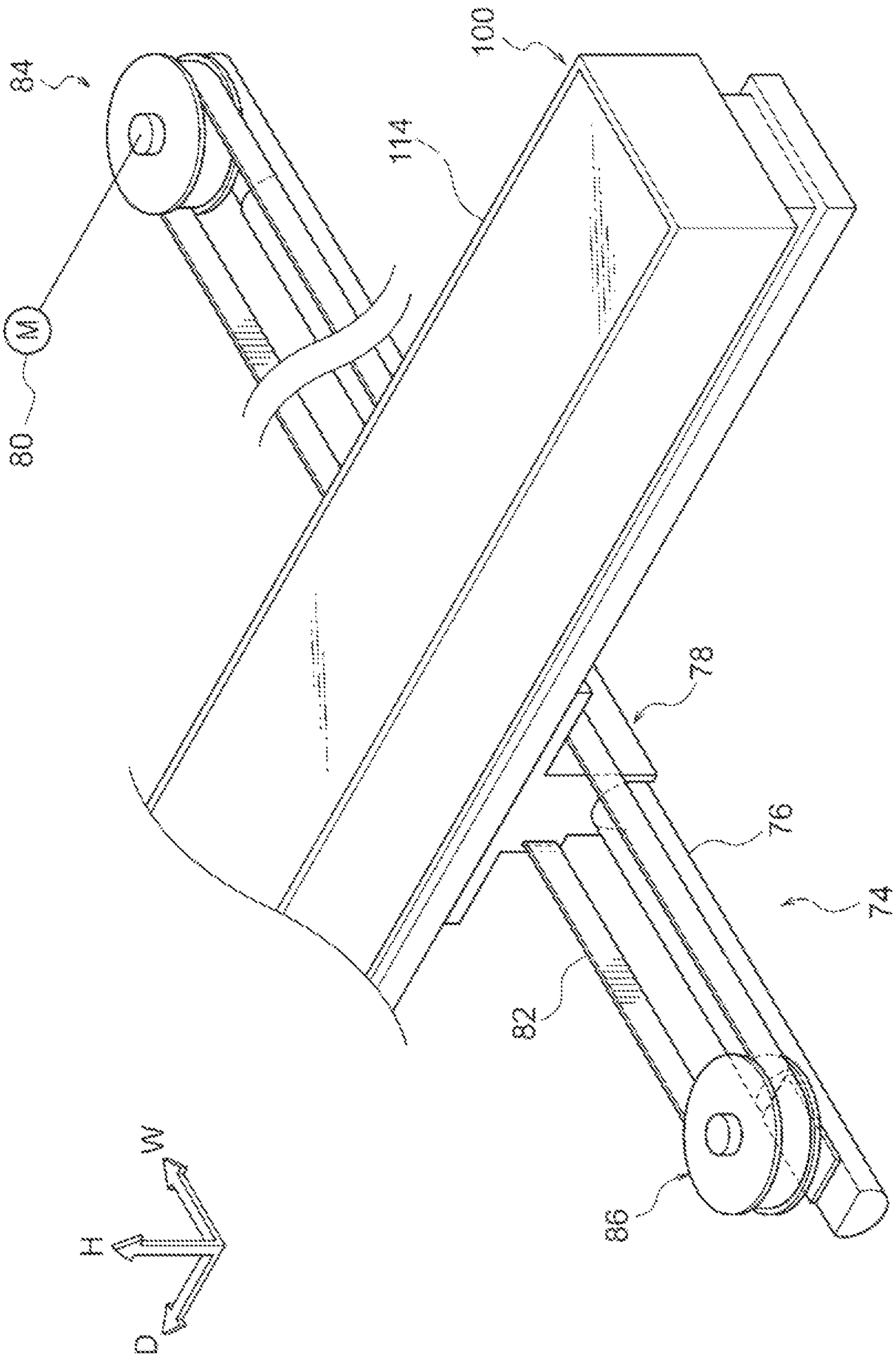
FIG. 3 is a perspective view of an image reading device according to an exemplary embodiment of the present disclosure.

As illustrated in FIG. 2 and FIG. 3, the driving device 74 includes a shaft 76 that extends in the apparatus width direction (the direction in which the image reading device 100 moves), and a slidable member 78 attached to the lower surface of a housing 114 of the image reading device 100 and slidably supported on the shaft 76.

The driving device 74 also includes a motor 80, a driving pulley 84 that drives to rotate with a driving force transmitted from the motor 80, a driven pulley 86 that is driven to rotate, and an endless belt 82 wound around the driving pulley 84 and the driven pulley 86. The driving pulley 84 is attached to a first end of the shaft 76, and the driven pulley 86 is attached to a second end of the shaft 76.

Figure 4:
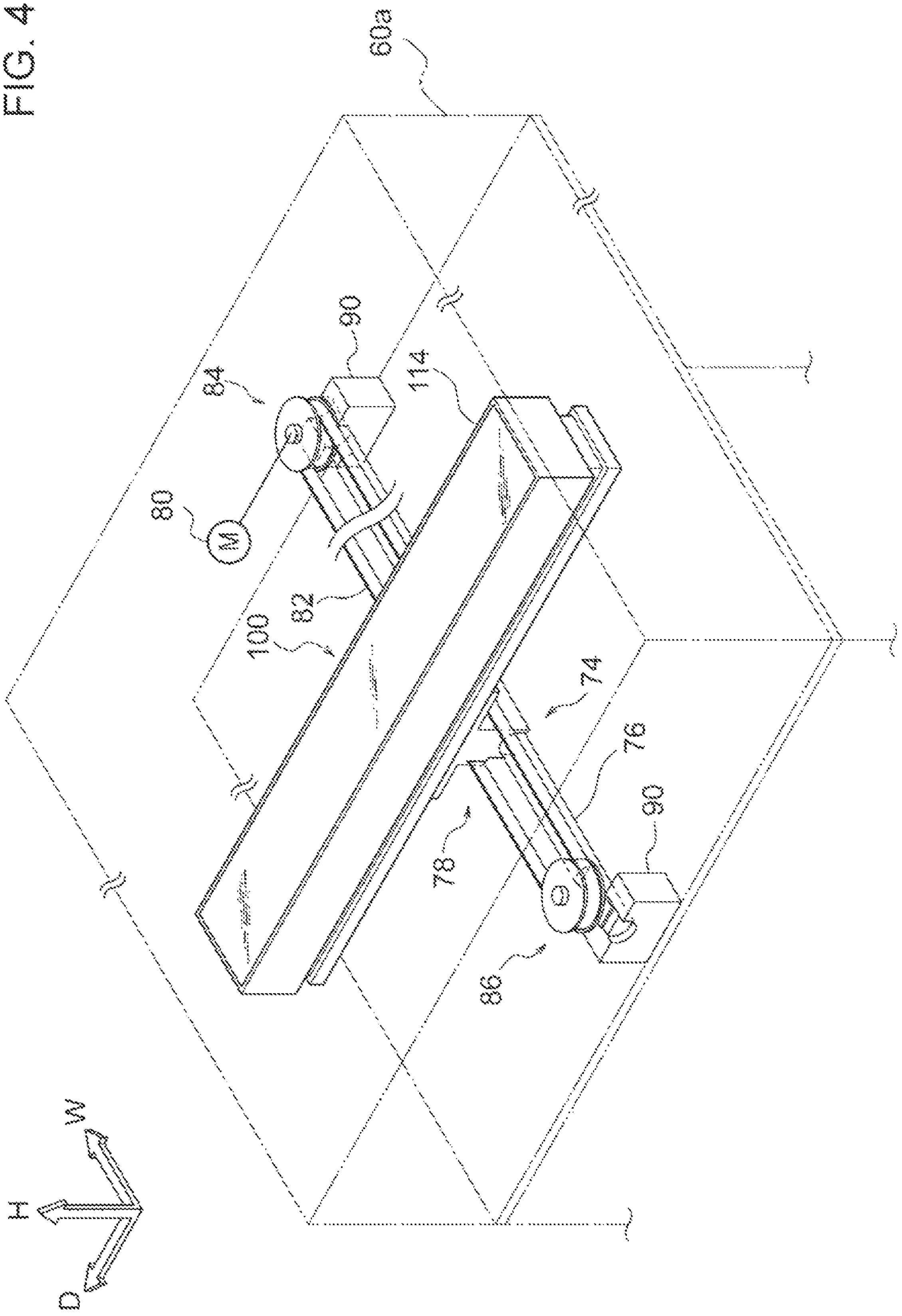
FIG. 4 is an entire perspective view of the image reading device according to the exemplary embodiment of the present disclosure.
Figure 5:
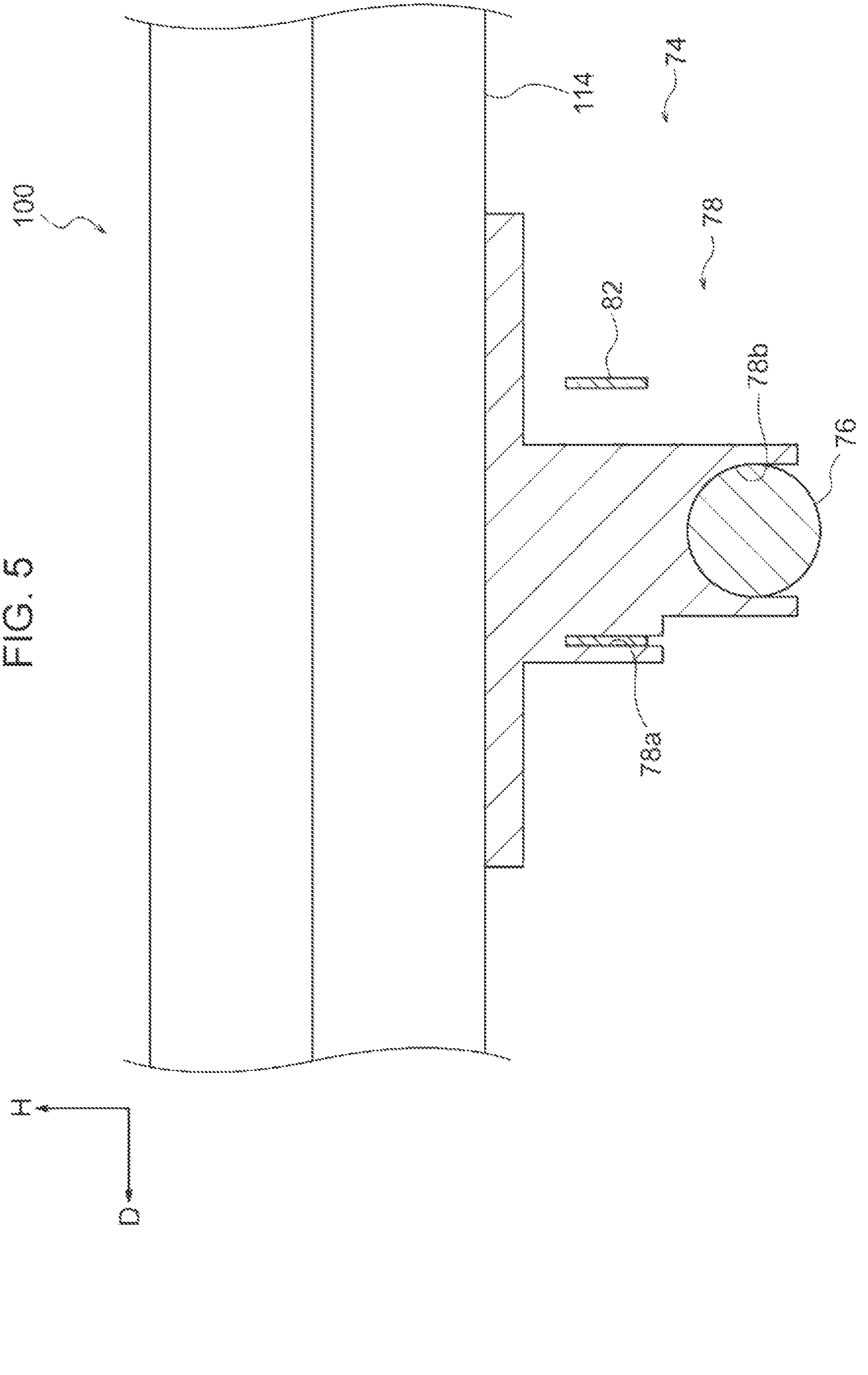
FIG. 5 is a front view of components including a driving device of the image reading device according to the exemplary embodiment of the present disclosure.

As illustrated in FIG. 4, the slidable member 78 is attached to the lower surface of the housing 114 at a center portion in the apparatus depth direction. As illustrated in FIG. 5, the slidable member 78 includes a slit 78*a* that extends in the height direction and having part of the endless belt 82 fitted thereto, and a sliding surface 78*b* that is semicircular when viewed in the apparatus width direction, and that slides over the shaft 76.

As illustrated in FIG. 4, a pair of supporters 90 that support the shaft 76 at both end portions from below are integrated with the housing 60*a*.

Figure 6:
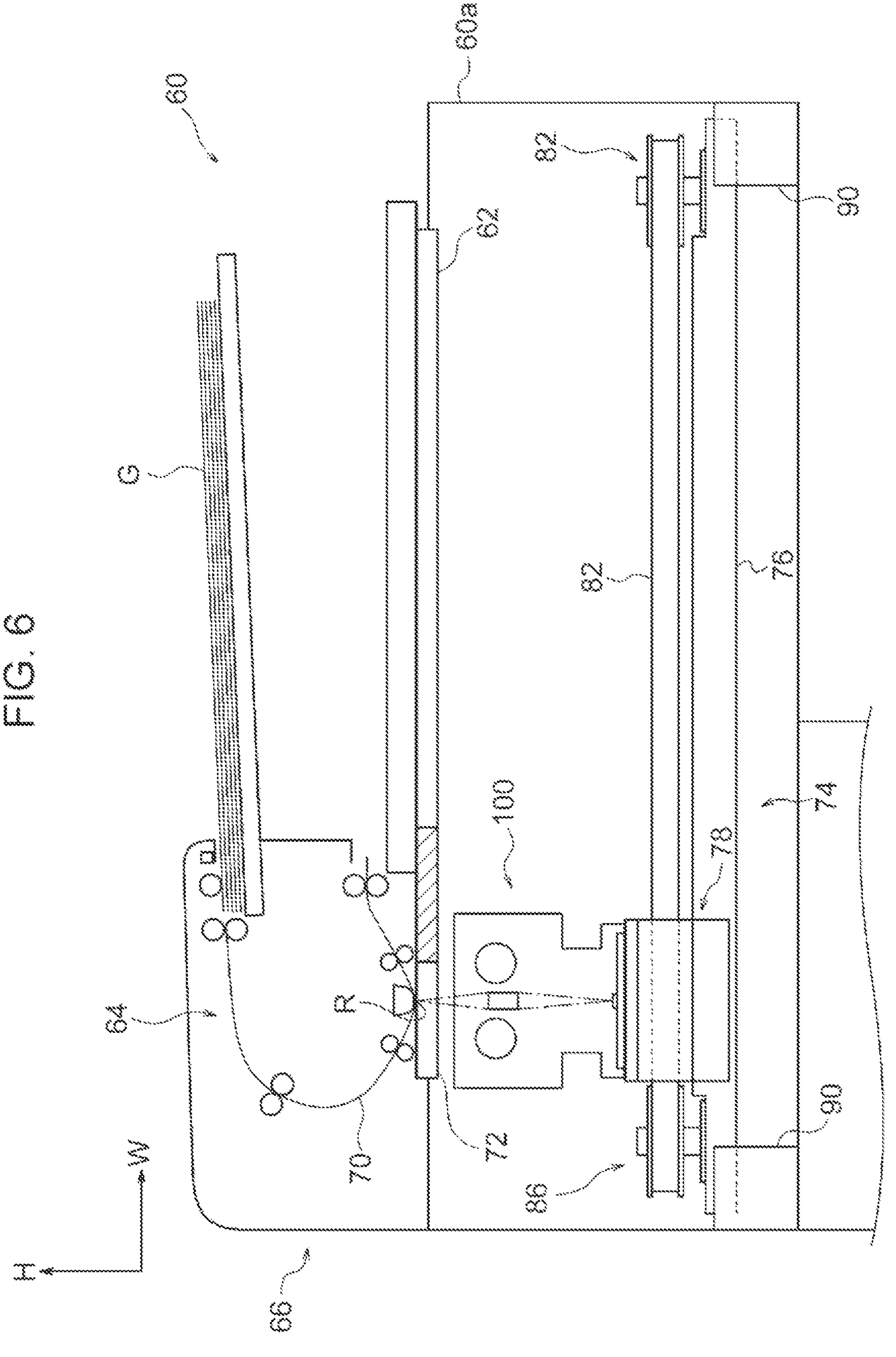
FIG. 6 is a schematic diagram of the image reading device according to the exemplary embodiment of the present disclosure.

In this structure, as illustrated in FIG. 6, to read an image on each document G transported by the transport device 64, the image reading device 100 receives a driving force from the motor 80 (refer to FIG. 4) via the endless belt 82, and moves to and stops at a transport read position at the end portion in the apparatus width direction. Then, the image reading device 100 located at the transport read position reads the image on the document G transported by the transport device 64.

In contrast, to read the image on the document G placed on the first transparent plate 62, as illustrated in FIG. 2, the image reading device 100 located at the read start position (indicated with a solid line in the drawing) moves in the apparatus width direction along the first transparent plate 62 to a read finish position (a two-dot chain line in the drawing) while reading the image on the document G. The image reading device 100 reads the image on the document G placed on the first transparent plate 62 in this manner.

Image Reading Device 100

Subsequently, the image reading device 100 is described in detail.

Figure 7:
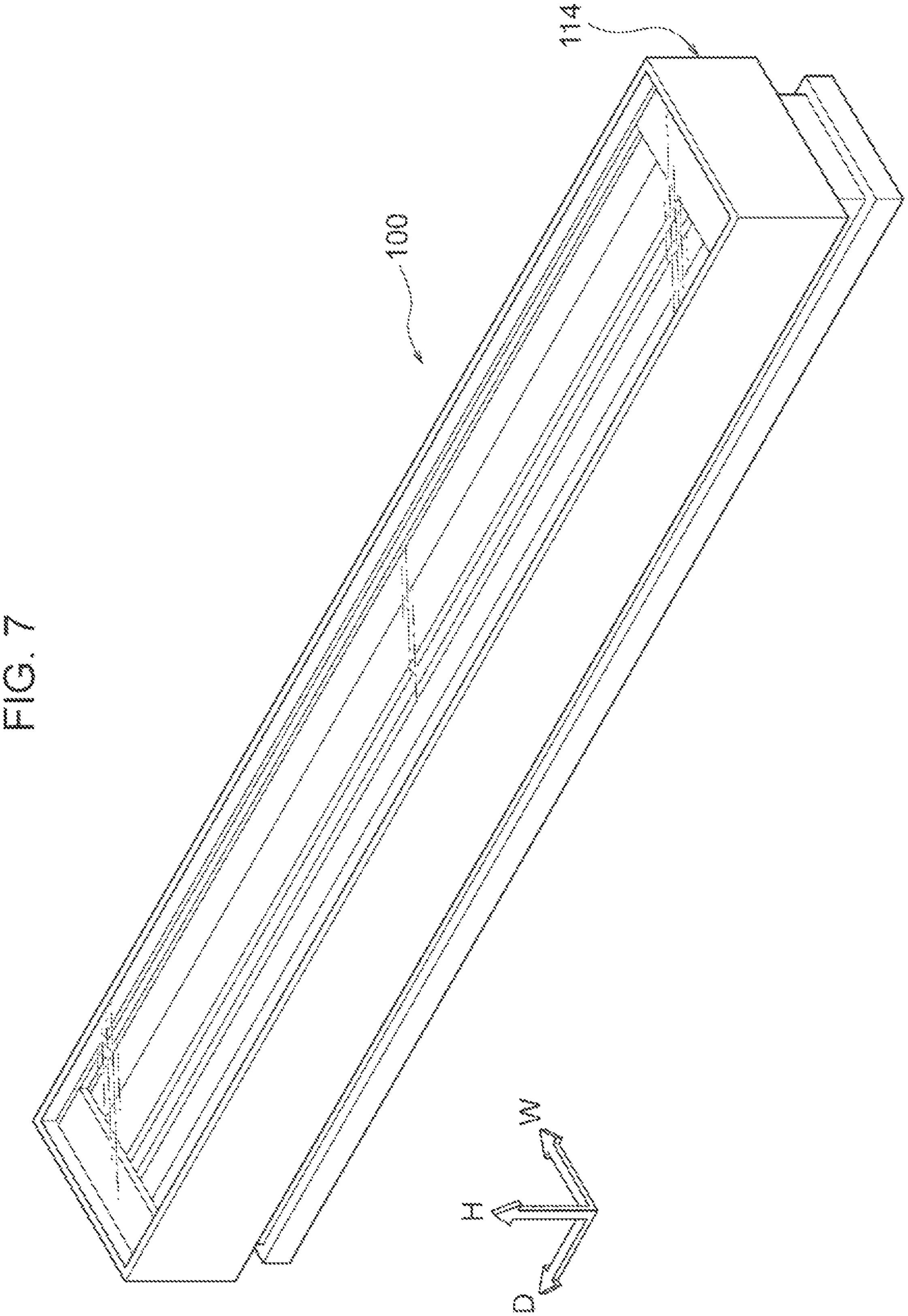
FIG. 7 is an entire perspective view of the image reading device according to the exemplary embodiment of the present disclosure.
Figure 8:
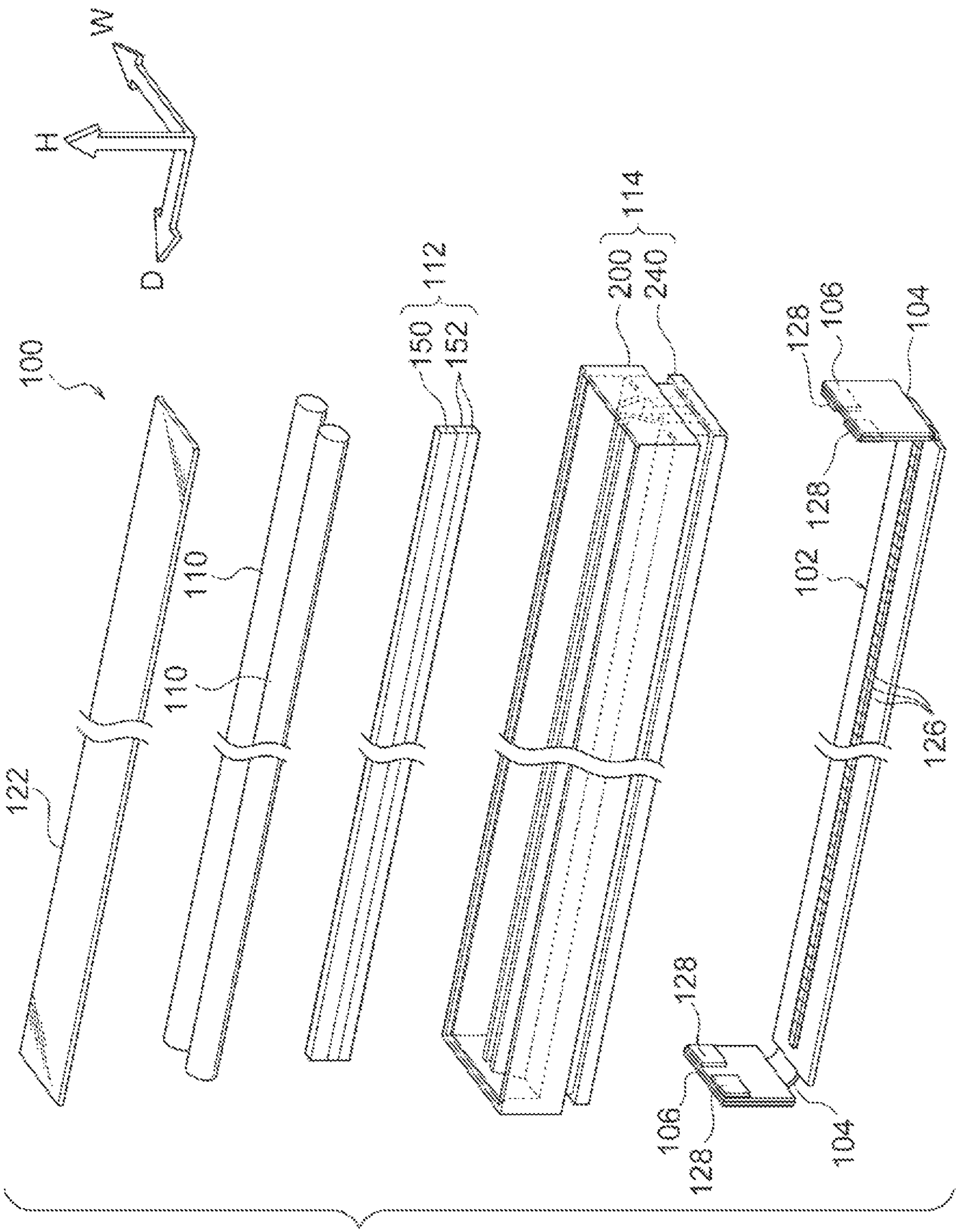
FIG. 8 is an exploded perspective view of the image reading device according to the exemplary embodiment of the present disclosure.

The image reading device 100 illustrated in FIG. 7 reads an image on the document G (target object) with a known contact image sensor (CIS) method. As illustrated in FIG. 8, the image reading device 100 includes a light receiving substrate 102, a pair of distribution cables 104 connected to the light receiving substrate 102, and rigid substrates 106 connected to the respective distribution cables 104. The image reading device 100 also includes light emitting elements 128 mounted on the rigid substrates 106, a pair of light guides 110 having a solid cylindrical shape, a condenser 112 that condenses reflected light reflected off the document G, and a housing 114. The image reading device 100 also includes a second glass plate 122 that covers the upper surface of the housing 114.

Except for a case of a special shape, the image reading device 100 is symmetrical with respect to the center in the apparatus width direction, and symmetrical with respect to the center in the apparatus depth direction.

Housing 114

As illustrated in FIG. 8, the housing 114 extends in the apparatus depth direction, and includes an upper housing 200 and a lower housing 240 disposed below the upper housing 200. The upper housing 200 is an example of a restriction member, and the lower housing 240 is an example of a correction member.

Figure 9:
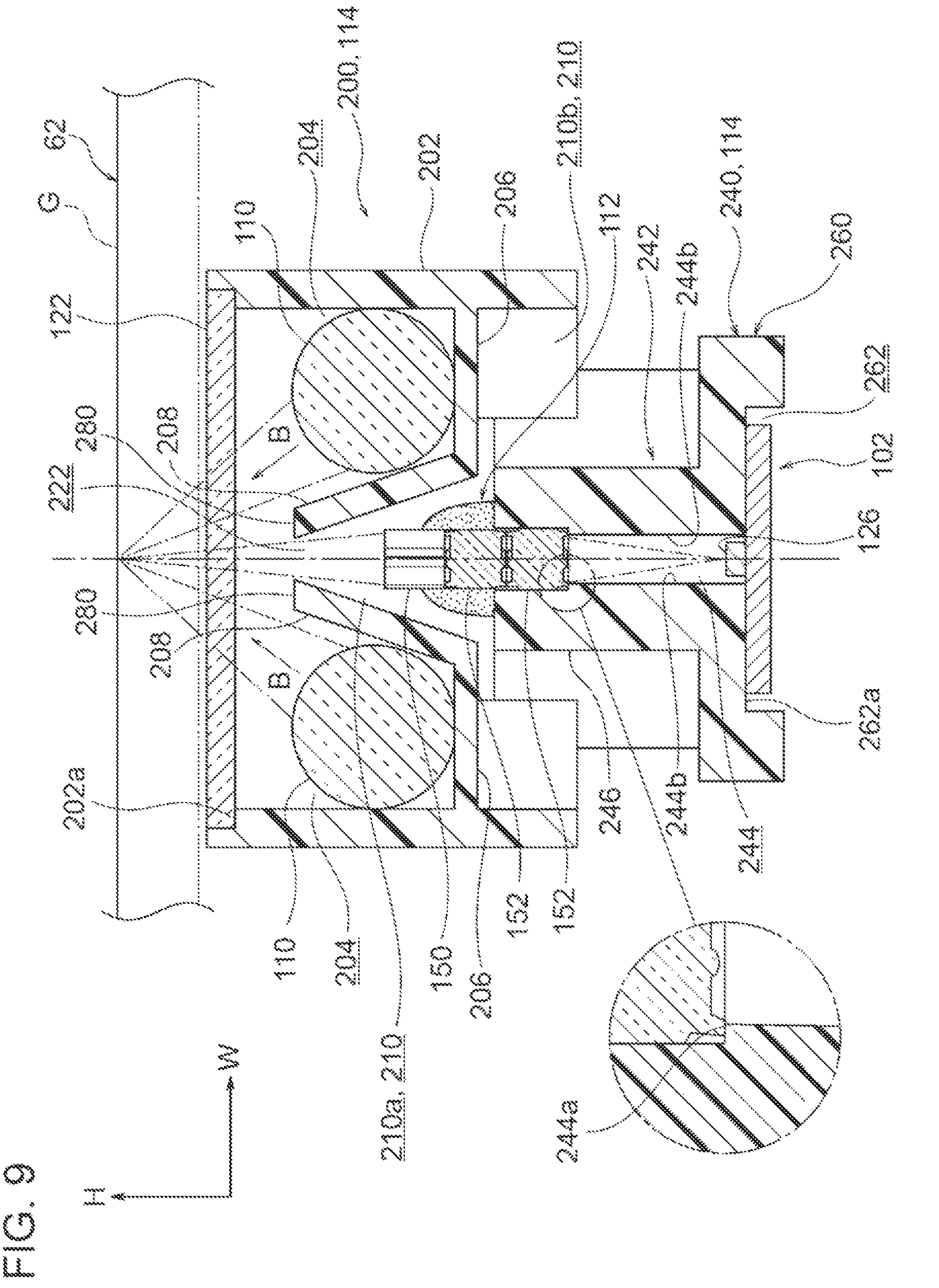
FIG. 9 is a cross-sectional view of the image reading device according to the exemplary embodiment of the present disclosure when viewed in a longitudinal direction.
Figure 10:
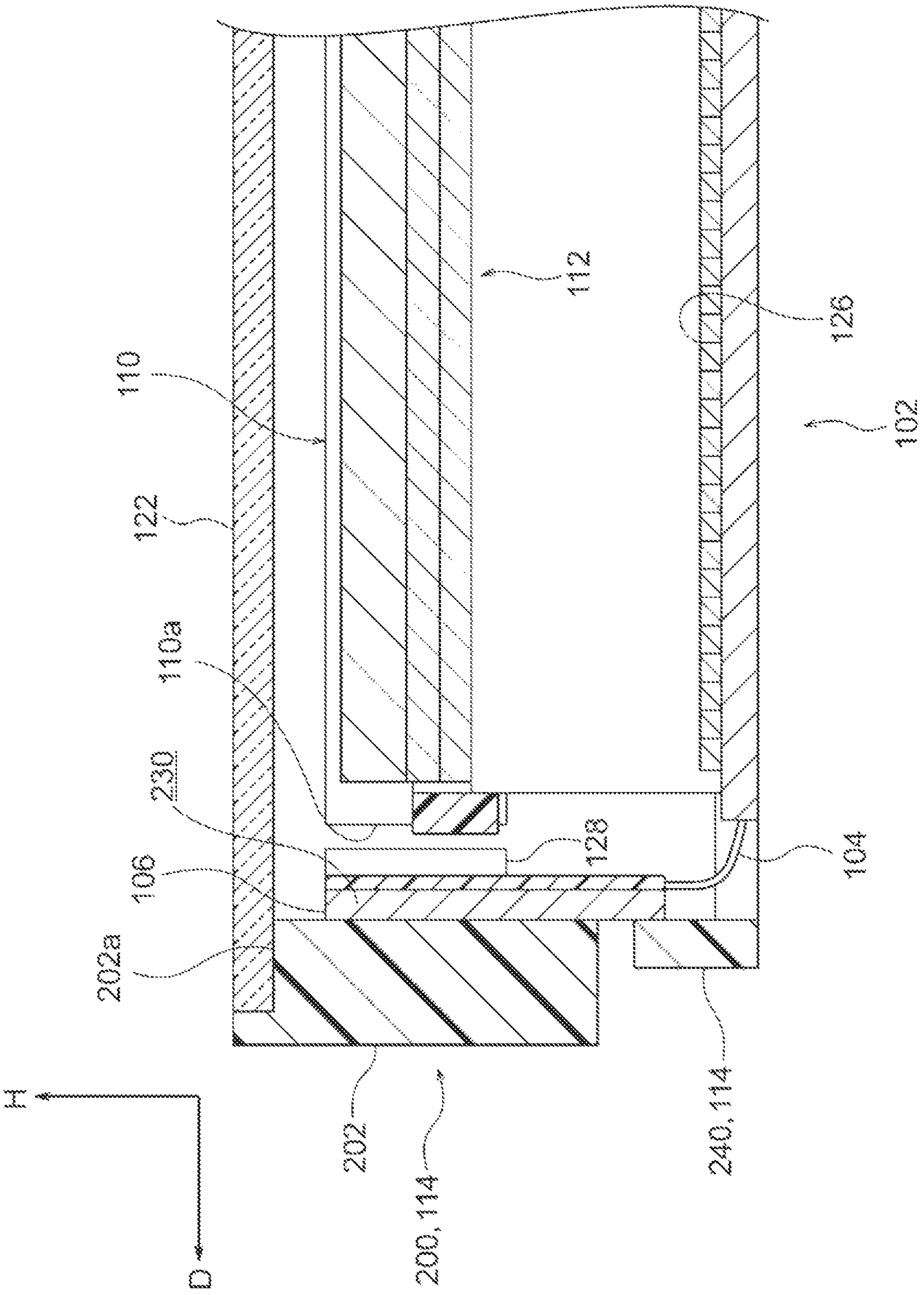
FIG. 10 is a cross-sectional view of the image reading device according to the exemplary embodiment of the present disclosure when viewed in a lateral direction.
Figure 11:
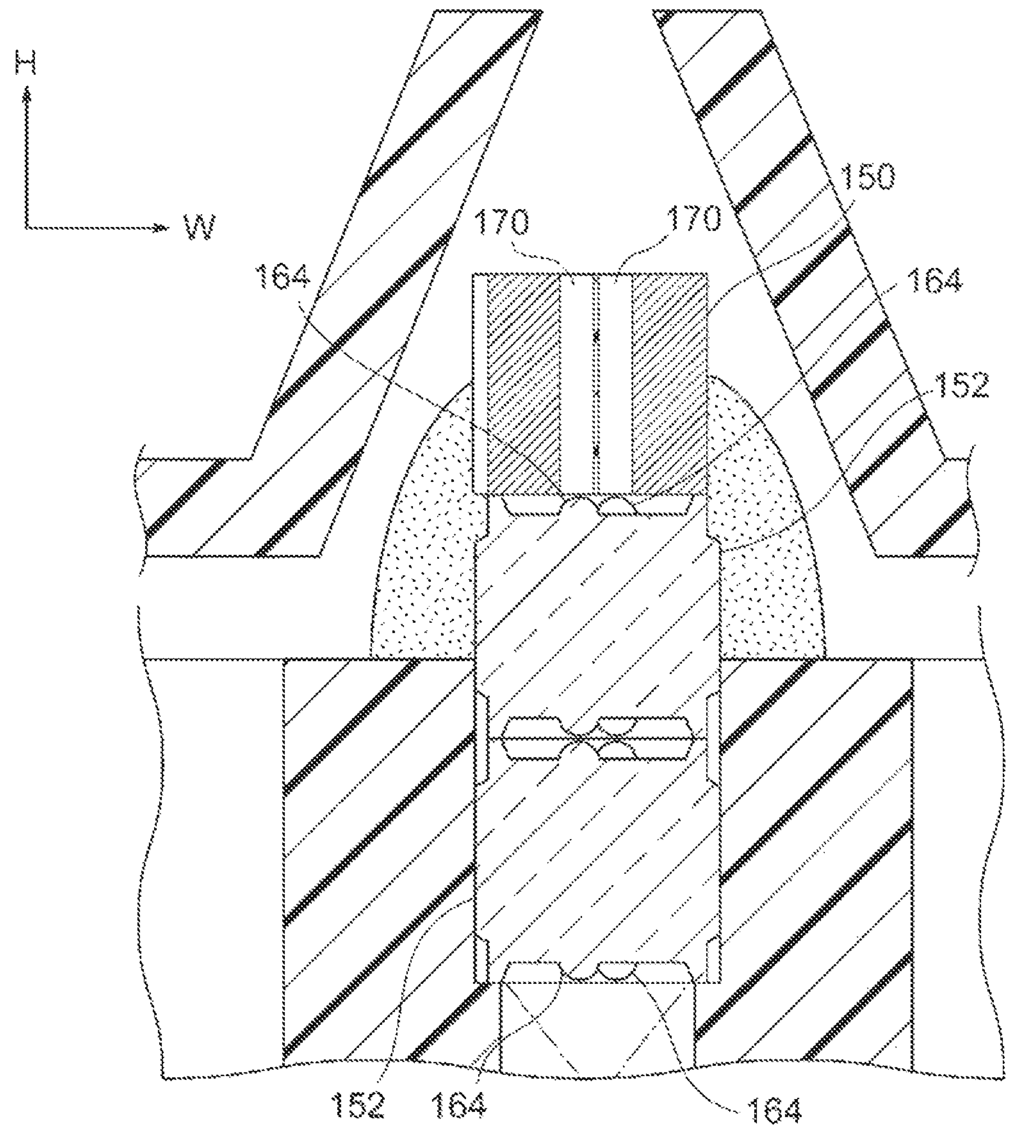
FIG. 11 is an enlarged cross-sectional view of the image reading device according to the exemplary embodiment of the present disclosure when viewed in the longitudinal direction.

As illustrated in FIG. 9 and FIG. 10, the upper housing 200 includes a step portion 202*a* that supports the edge portion of the second glass plate 122 from below, a pair of light-guide containers 204 that respectively accommodate the pair of light guides 110, a slit 222 that restricts the reflected light reflected off the document G, and a container 230 that accommodates the rigid substrates 106.

The lower housing 240 includes a through-hole 244 to which the condenser 112 is attached, and a container 262 that accommodates the light receiving substrate 102.

The upper housing 200 and the lower housing 240 are described in detail below.

Light Guides 110

The light guides 110 are formed from a transparent material such as resin or glass. As illustrated in FIG. 9, the light guides 110 are disposed on the side of the second glass plate 122 opposite to the side where the first transparent plate 62 is disposed, and arranged side by side in the apparatus width direction to form a pair. The light guides 110 are solid cylindrical, and extend in the apparatus depth direction. The light guides 110 are accommodated in the light-guide containers 204 of the upper housing 200. The apparatus depth direction is an example of a first direction.

The light guides 110 each have a center portion in the longitudinal direction fastened by a fastener to the upper housing 200 while allowing both end portions in the longitudinal direction to expand and contract in the apparatus depth direction. The fastener is not illustrated. As illustrated in FIG. 10, while the center portions of the light guides 110 in the longitudinal direction are fastened to the upper housing 200, end surfaces 110*a* of the light guides 110 and the light emitting elements 128 are spaced apart from each other in the apparatus depth direction. More specifically, the end surfaces 110*a* of the light guides 110 and the light emitting elements 128 are spaced apart from each other not to touch one another regardless of when the light guides 110 extend in the apparatus depth direction due to a change of the temperature or humidity. In other words, gaps between the end surfaces 110*a* of the light guides 110 and the light emitting elements 128 are set to have a dimension that does not allow the end surfaces 110*a* and the light emitting elements 128 to touch one another regardless of when the light guides 110 extend in the apparatus depth direction due to a change of the temperature or humidity.

The light guides 110 each include a reflection member (not illustrated) extending in the longitudinal direction. The reflection member allows light that is incident on the end surface 110*a* of the light guide 110 and propagates in the longitudinal direction of the light guide 110 to emerge upward of the condenser 112 (in the direction of arrows B in FIG. 9). Specific examples of the reflection member include uneven portions or portions undergoing white printing on surfaces of the light guides 110 opposite to the surfaces from which light emerges.

Condenser 112

As illustrated in FIG. 9, the condenser 112 is attached to the upper end portion of the through-hole 244 of the lower housing 240 while being spaced apart from a hole upstream portion 210*a* of a through-hole 210 in the upper housing 200. The condenser 112 is a rectangular parallelepiped extending in the apparatus depth direction, and includes a light-shielding member 150 and a pair of lens arrays 152.

Lens Arrays 152

Figure 12:
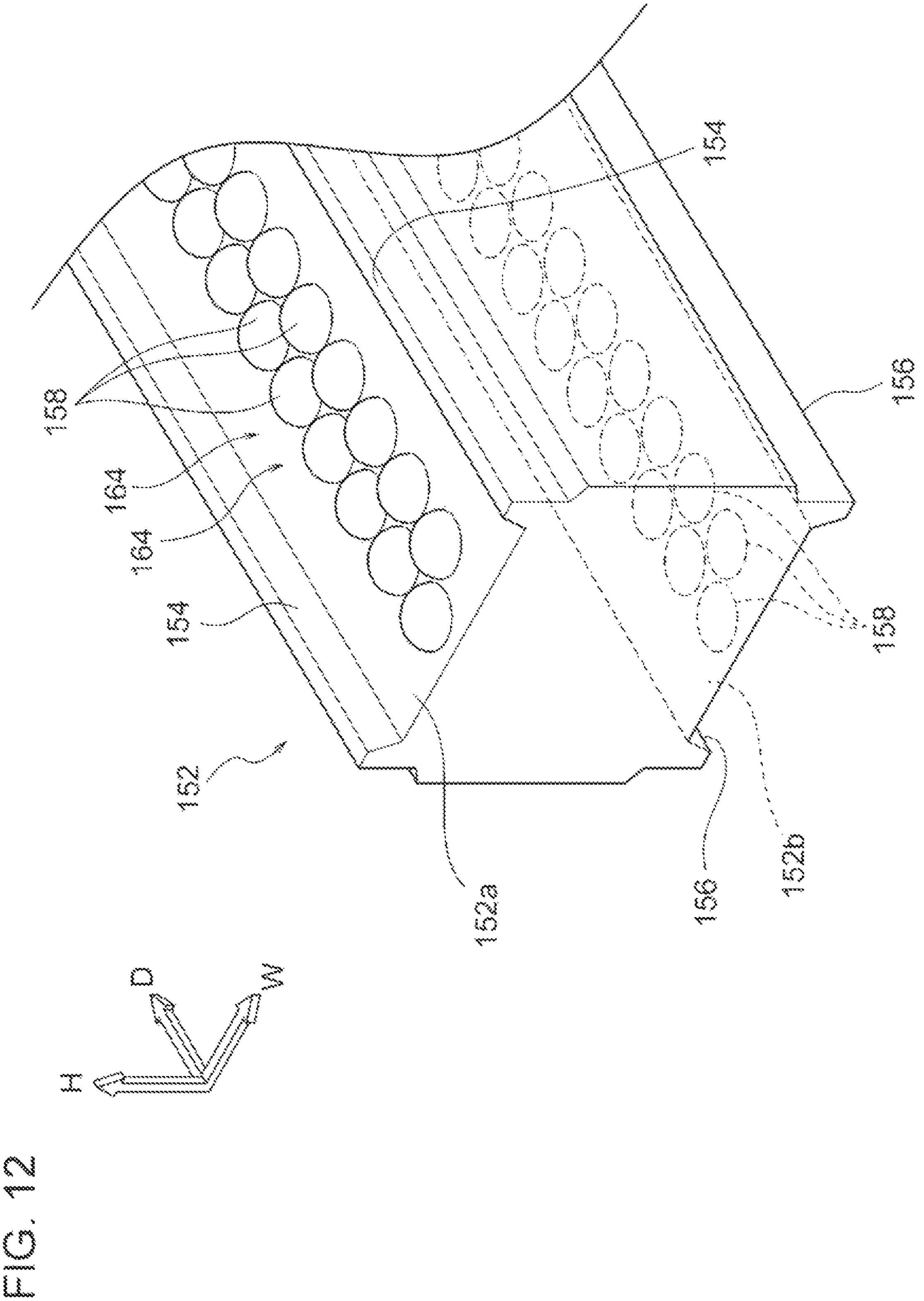
FIG. 12 is an enlarged perspective view of a lens array included in the image reading device according to the exemplary embodiment of the present disclosure.
Figure 13:
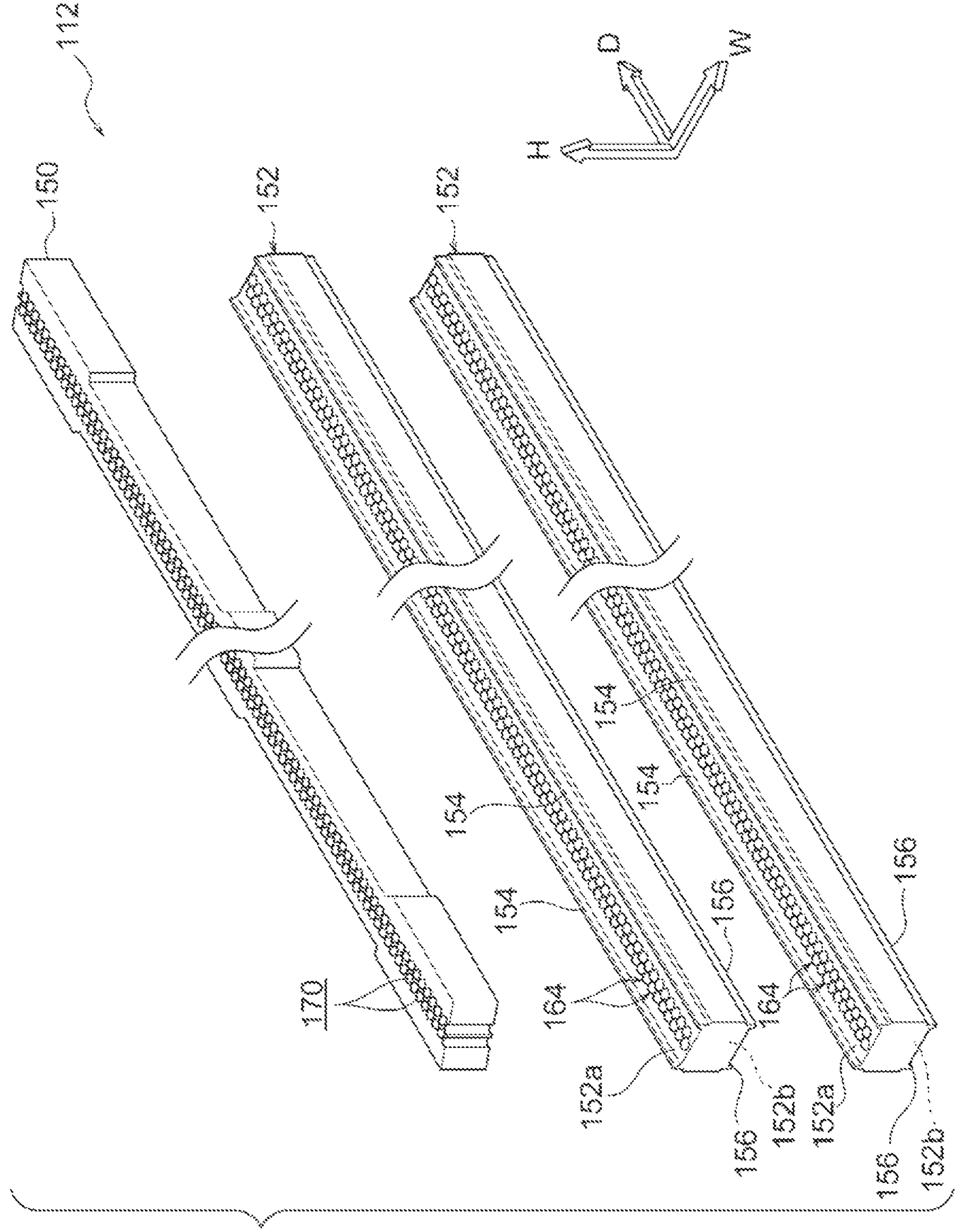
FIG. 13 is an exploded perspective view of a condenser included in the image reading device according to the exemplary embodiment of the present disclosure.

The lens arrays 152 are each formed integrally (with, for example, injection molding) from, for example, polymethyl methacrylate (PMMA), which is a transparent resin material, and are rectangular parallelepiped to extend in the apparatus depth direction. As illustrated in FIG. 12 and FIG. 13, each lens array 152 includes a rectangular upper surface 152*a* facing upward in the apparatus height direction and extending in the apparatus depth direction when viewed from above, and a rectangular lower surface 152*b* facing downward in the apparatus height direction and extending in the apparatus depth direction when viewed from below. The pair of lens arrays 152 are examples of optical members.

Each of the lens arrays 152 also includes ridges 154 at both edges of the upper surface 152*a* in the apparatus width direction, and ridges 156 at both edges of the lower surface 152*b* in the apparatus width direction. The ridges 154 extend in the apparatus depth direction and protrude upward. The ridges 156 extend in the apparatus depth direction and protrude downward.

Multiple lens surfaces 158 protrude from the upper surface 152*a* and the lower surface 152*b*. The lens surfaces 158 protrude from the upper surface 152*a* or the lower surface 152*b* by a distance that is smaller than the distance by which the ridges 154 or 156 protrude from the upper surface 152*a* or the lower surface 152*b*.

Figure 14:
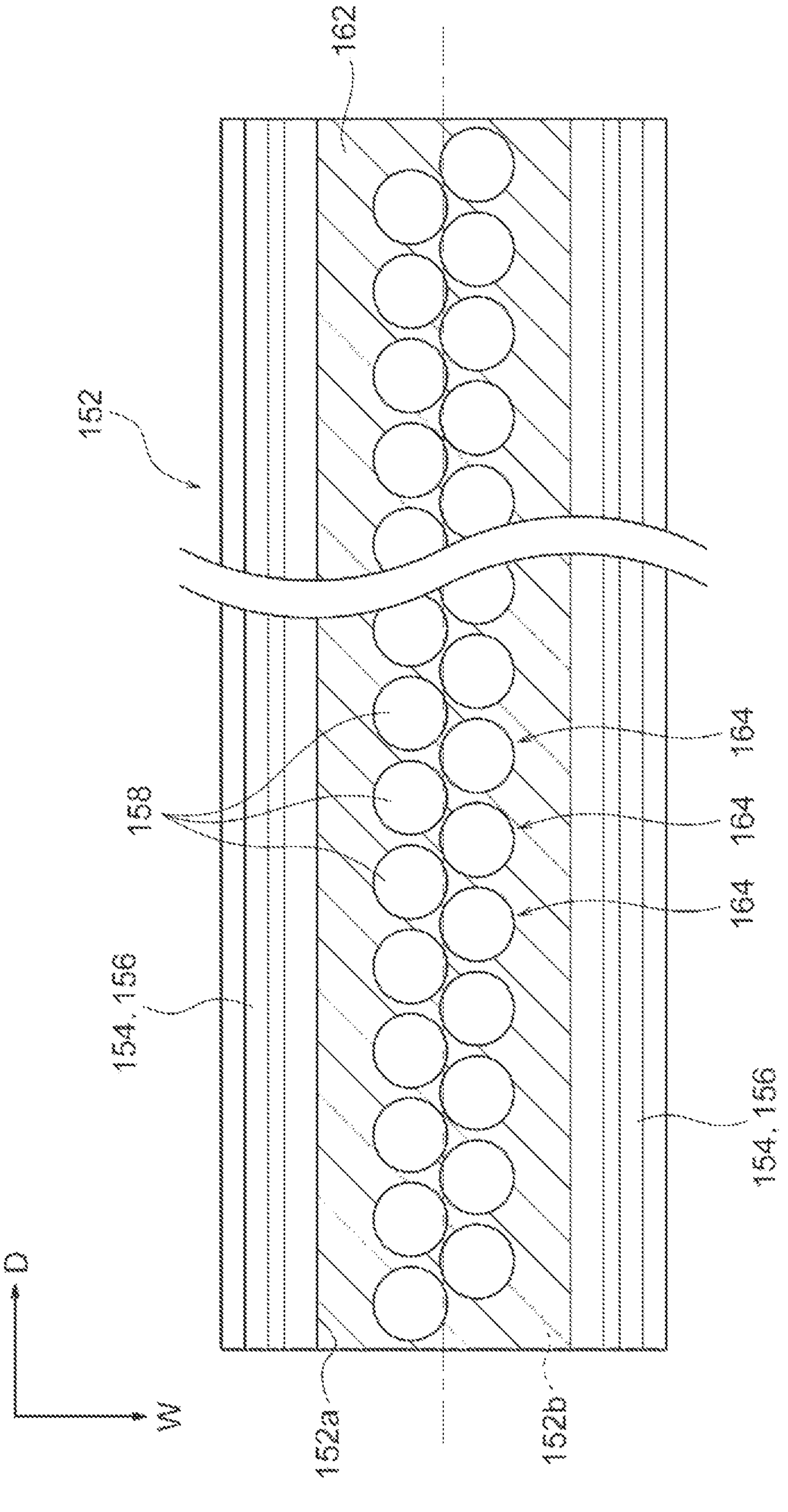
FIG. 14 is a plan view of the lens array included in the image reading device according to the exemplary embodiment of the present disclosure.

The lens surfaces 158 are staggered to form two rows in the apparatus depth direction (refer to FIG. 14). Staggered in this case indicates alternately arranged. The lens surfaces

158 formed on the upper surface 152*a* and the lens surfaces 158 formed on the lower surface 152*b* are arranged at the same, equivalent, or corresponding positions when viewed in the apparatus height direction. In other words, the lens axes (optical axes) of the lens surfaces 158 formed on the upper surface 152*a* overlap the lens axes (optical axes) of the lens surfaces 158 formed on the lower surface 152*b*, and these paired lens surfaces 158 form microlenses 164. The lens axis (optical axis) in this case indicates an axis of each microlens 164 passing through the center (vertex) of each lens surface 158. The optical axis direction overlaps with the propagation direction of the reflected light reflected off the document G.

As illustrated in FIG. 14, a light-shielding film 162 that reduces light transmission is disposed on each of the upper surface 152*a* and the lower surface 152*b*. More specifically, each light-shielding film 162 surrounds the lens surfaces 158 while leaving the lens surfaces 158 exposed to the outside, and spaces the ridges 154 or 156 apart from each other in the apparatus width direction (a hatched portion in FIG. 14).

Figure 15:
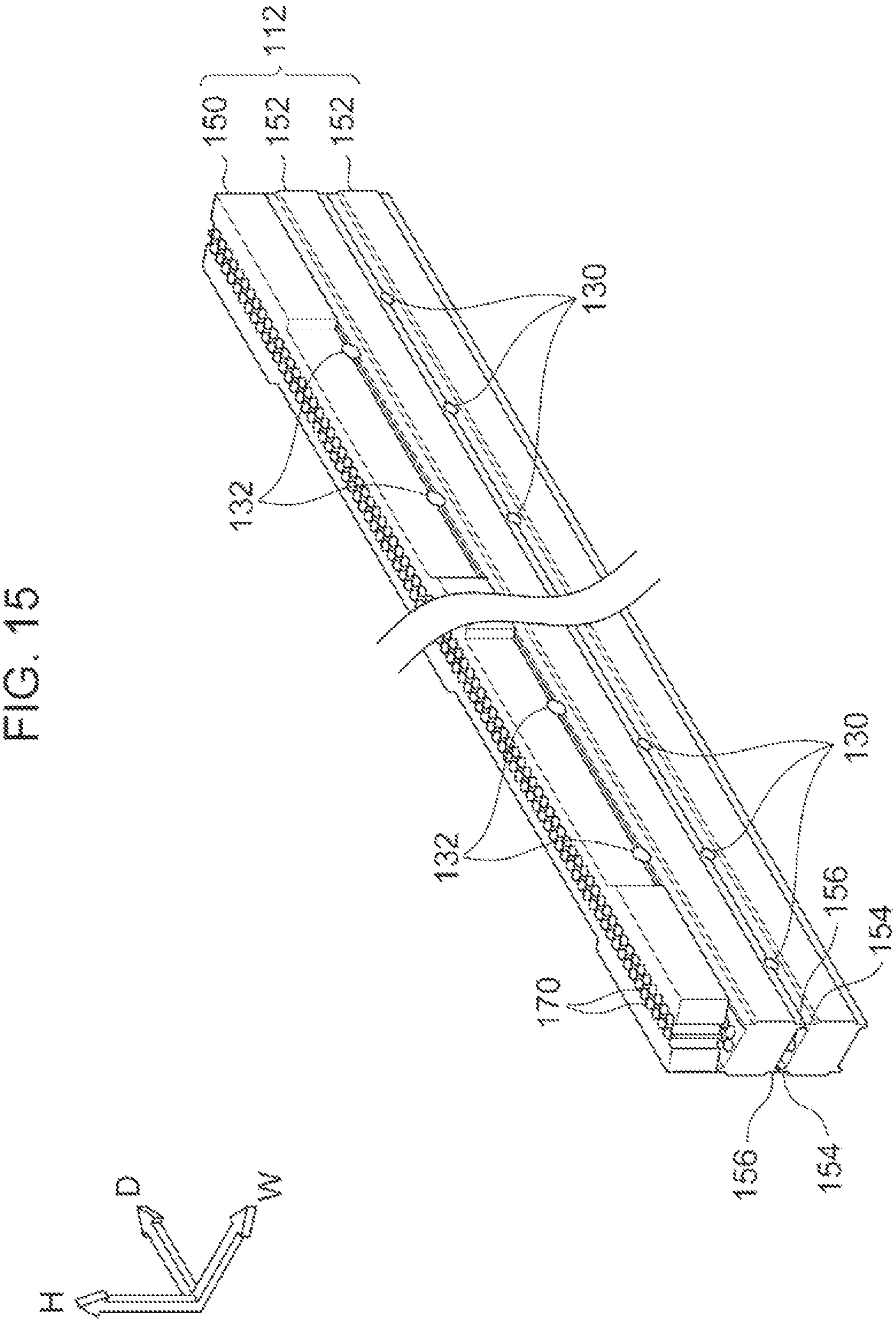
FIG. 15 is a perspective view of the condenser included in the image reading device according to the exemplary embodiment of the present disclosure.

As illustrated in FIG. 13 and FIG. 15, in this structure, the pair of lens arrays 152 are arranged while abutting the vertices of the ridges 154 and 156 of the lens arrays 152 against one another to overlap the optical axes of the microlenses 164 of a first one of the lens arrays 152 with the optical axes of the microlenses 164 of a second one of the lens arrays 152.

Here, the first lens array 152 indicates the upper lens array 152, or the lens array 152 on the upper side in the FIG. 13 and FIG. 15. The second lens array 152 indicates the lower lens array 152, or the lens arrays 152 on the lower side in FIG. 13 and FIG. 15. The light-shielding films 162 are formed by, for example, applying black paint with the ink-jet method.

The light-shielding films 162 may be simply formed on the upper surface 152*a* of the first lens array 152 of the pair of lens arrays 152 fastened with an adhesive 130 and the lower surface 152*b* of the second lens array 152. In other words, the light-shielding film 162 may be excluded from the opposing surfaces of the pair of lens arrays 152 (the lower surface 152*b* of the first lens array 152 and the upper surface 152*a* of the second lens array 152) fastened with the adhesive 130.

Light-Shielding Member 150

Figure 16:
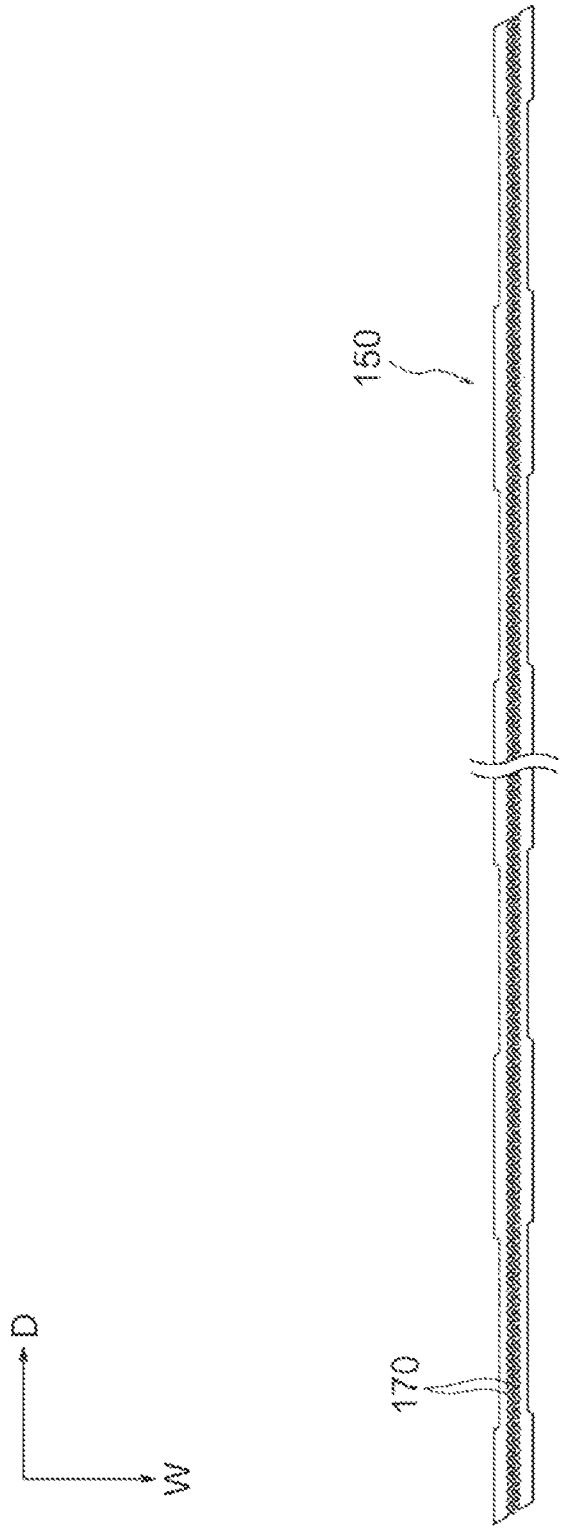
FIG. 16 is a plan view of a light-shielding member included in the image reading device according to the exemplary embodiment of the present disclosure.
Figure 17:
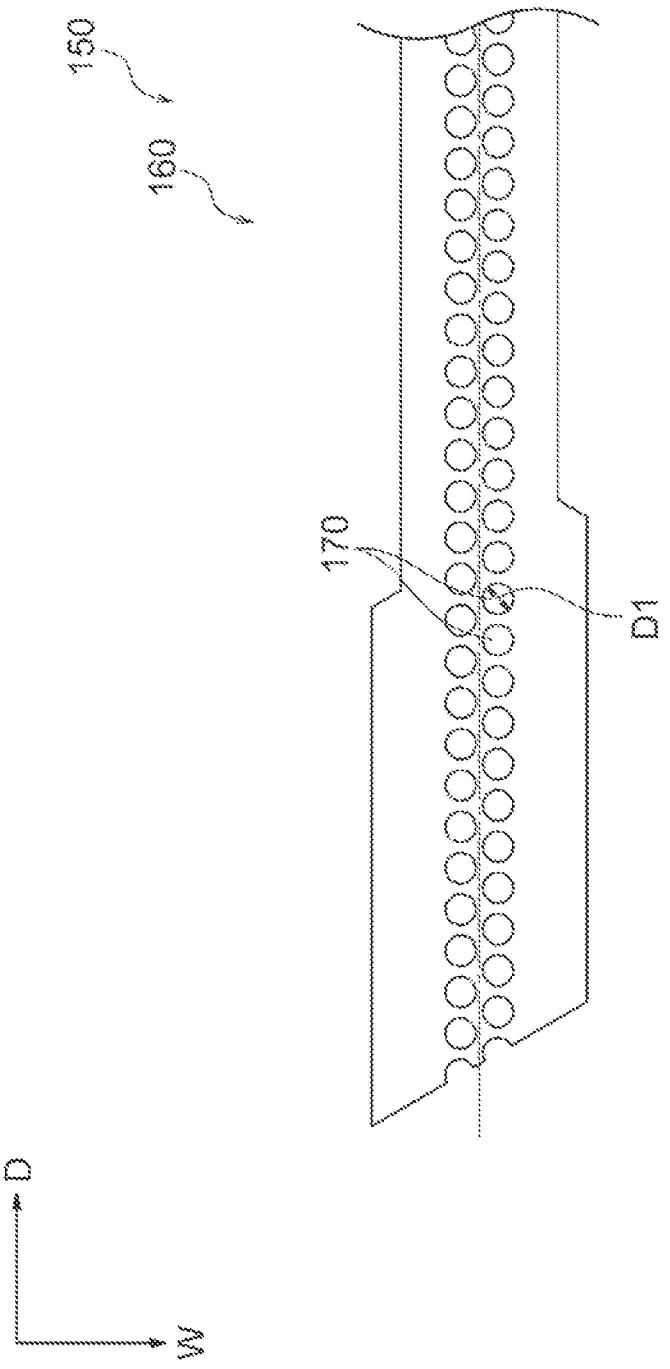
FIG. 17 is an enlarged plan view of the light-shielding member included in the image reading device according to the exemplary embodiment of the present disclosure.

As illustrated in FIG. 16 and FIG. 17, the light-shielding member 150 extends in the apparatus depth direction, and has multiple circular through-holes 170 extending through in the apparatus height direction. The light-shielding member 150 allows light to pass through the through-holes 170 to reduce light propagating in the direction inclined with respect to the axial directions of the through-holes 170.

The through-holes 170 are staggered to form two rows in the apparatus depth direction. More specifically, the through-holes 170 are arranged in the apparatus depth direction at equivalent, the same, or regular intervals. The through-holes 170 are arranged in the apparatus depth direction in two rows. A first one of the rows of the through-holes 170 and a second one of the rows of the through-holes 170 are shifted in the apparatus depth direction. In other words, the through-holes 170 each extending in the apparatus height direction are arranged in the apparatus depth direction in two rows adjacent in the apparatus width direction.

Thus, the multiple through-holes 170 viewed from above overlap the multiple microlenses 164 (refer to FIG. 12)

formed on the lens arrays 152 viewed from above. In other words, the through-holes 170 of the light-shielding member 150 are located to correspond to the respective microlenses 164 of the pair of lens arrays 152.

The light-shielding member 150 is formed by fastening (bonding) six light-shielding portions 160 extending in the apparatus depth direction together with a bond such as an adhesive while being arranged in the apparatus depth direction.

The light-shielding portions 160 are formed integrally (with, for example, injection molding) with a black resin material (for example, acrylonitrile-butadiene-styrene copolymer resin or ABS resin). In the present exemplary embodiment, for example, the light-shielding portions 160 in FIG. 18A has a dimension in the apparatus depth direction (L2 in FIG. 18A) of 56 mm, and a dimension in the height direction (T1 in FIG. 18B) of 5 mm.

Figure 18A:
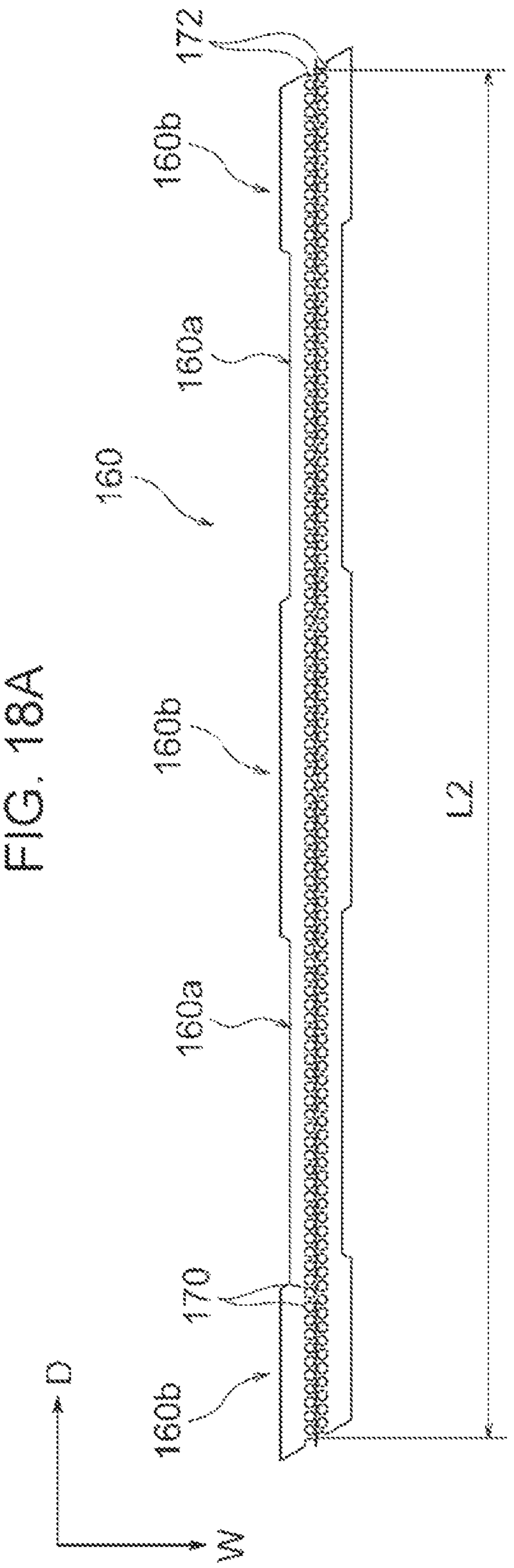
FIGS. 18A and 18B are a plan view and a side view of the light-shielding member included in the image reading device according to the exemplary embodiment of the present disclosure.
Figure 18B:
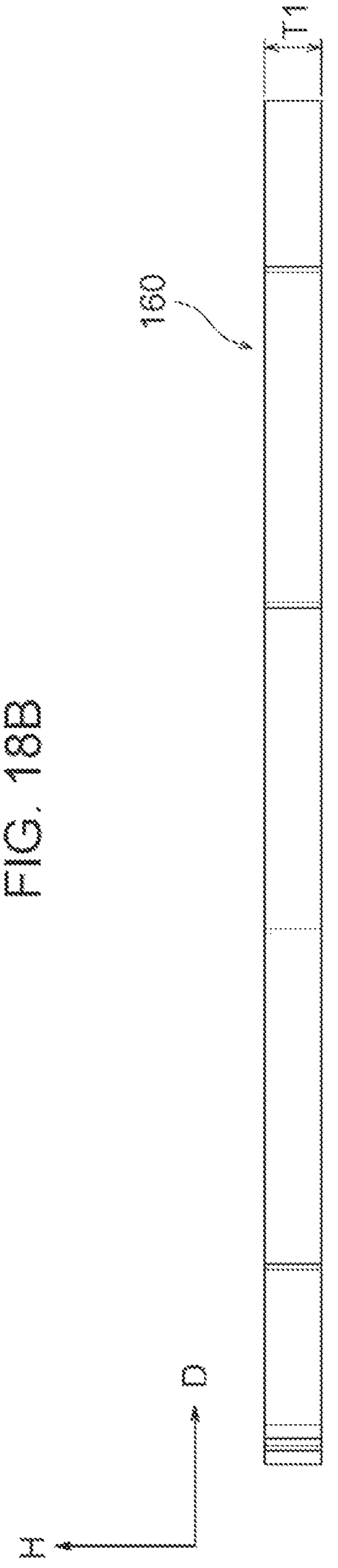

As illustrated in FIG. 18A, each light-shielding portion 160 has through-holes 170. At each of both end portions of the light-shielding portion 160 in the apparatus depth direction, two semicircular grooves 172 extend in the apparatus height direction. When the light-shielding portions 160 are arranged in the apparatus depth direction and joined together, the grooves 172 adjacent to each other face to form one through-hole 170.

Each light-shielding portion 160 includes base portions 160*a* extending in the apparatus depth direction, and extension portions 160*b* disposed at a center and both end portions of the light-shielding portion 160 in the apparatus depth direction. Each extension portion 160*b* extends to both sides in the apparatus width direction with respect to the base portion 160*a*.

In this structure, the reflected light reflected off the document G and passing through the slit 222 passes through the through-holes 170 in the light-shielding member 150, and, as illustrated in FIG. 9, is incident on the microlenses 164 of the first lens array 152.

In the reflected light passing through the through-holes 170, light inclined with respect to the apparatus height direction (axial directions of the through-holes 170) may be once reflected off the inner surfaces of the through-holes 170 of the light-shielding portions 160, and incident on the microlenses 164. However, light that enters the through-holes 170 at a large inclination angle is reflected multiple times off the inner surfaces of the through-holes 170, and has its amount repeatedly attenuated. Thus, the amount of light is at a negligible level regardless of when incident on the microlenses 164. Thus, the light-shielding member 150 disposed on the pair of lens arrays 152 reduces incidence of a large amount of stray light on the microlenses 164. At this time, stray light occurs at a portion out of an originally intended optical path, and is not used.

Light incident on the microlenses 164 of the first lens array 152 emerges from the microlenses 164 of the first lens array 152, and is incident on the microlenses 164 of the second lens array 152. Light incident on the microlenses 164 of the second lens array 152 emerges from the microlenses 164 of the second lens array 152 and converges to a light receiving element 126.

When the positions where the vertices of the ridges 156 of the first lens array 152 and the vertices of the ridges 154 of the second lens array 152 abut against each other are referred to as abutment positions, FIG. 9 illustrates a structure where the distance from the abutment position to the light receiving element 126 is shorter than the distance from the abutment position to the document G. Here, FIG. 9 is a mere exemplary drawing. In actual, the distance from the abutment position to the document G and the distance from the abutment position to the light receiving element 126 are the same or equivalent to each other. Here, the distance from the abutment position to the document G in FIG. 9 may be shorter than the distance from the abutment position to the light receiving element 126.

Light Receiving Substrate 102

As illustrated in FIG. 9, the light receiving substrate 102 has a thickness in the height direction, and is disposed at a lower end portion of the lower housing 240. The light receiving substrate 102 is fastened to the lower housing 240 with an adhesive (not illustrated) applied across the light receiving substrate 102 and a spot-facing surface 262*a* of the lower housing 240 while having its upper surface in contact with the spot-facing surface 262*a*. The light receiving substrate 102 is an example of a substrate.

When viewed from above, the light receiving substrate 102 has a rectangular shape extending in the apparatus depth direction. On the upper surface of the light receiving substrate 102, the multiple light receiving elements 126 are arranged in a line in the apparatus depth direction. The light receiving elements 126 mounted on the light receiving substrate 102 face the condenser 112 in the height direction (refer to FIG. 9).

Distribution Cables 104

As illustrated in FIG. 8, the pair of distribution cables 104 are flexible flat cables having base ends connected to both end portions of the light receiving substrate 102 in the apparatus depth direction. The base end of one of the distribution cables 104 is connected to the far (left in the drawing) end portion of the light receiving substrate 102 in the apparatus depth direction, and the base end of the other distribution cable 104 is connected to the front (right in the drawing) end portion of the light receiving substrate 102 in the apparatus depth direction.

Rigid Substrates 106

As illustrated in FIG. 8, the pair of rigid substrates 106 are connected to distal ends of the distribution cables 104, and have a rectangular shape extending in the apparatus width direction when viewed in the apparatus depth direction. Two light emitting diodes (LEDs) 128 (referred to as light emitting elements 128, below) adjacent in the apparatus width direction are mounted on first surfaces (surfaces opposing each other) of the rigid substrates 106.

As illustrated in FIG. 10, the rigid substrates 106 are accommodated in the container 230 of the upper housing 200 while opposing the end surfaces 110*a* of the light guides 110.

Second Glass Plate 122

As illustrated in FIG. 8, the second glass plate 122 has a thickness in the height direction, and has a rectangular shape extending in the apparatus depth direction when viewed from above. As illustrated in FIG. 9, the second glass plate 122 is fastened to the upper housing 200 with a fastener not illustrated, while having its edge portion in contact with the step portion 202*a* of the upper housing 200, to cover the upper surface of the upper housing 200.

Structure of Related Portions

Subsequently, the housing 114 is described in detail. As described above, the housing 114 includes the upper housing 200 and the lower housing 240.

Upper Housing 200

The upper housing 200 is formed from resin, such as black modified-polyphenylenether resin (m-PPE) by molding (such as injection molding). As illustrated in FIG. 9 and FIG. 10, the upper housing 200 includes a frame-shaped body 202 including the step portion 202*a* that supports the edge portion of the second glass plate 122 from below. As described above, the upper housing 200 is black. Black here is a color with a chromaticity difference ΔE from the achromatic point (x=0.333, y=0.333, and Y=0) within 100.

The body 202 of the upper housing 200 has the pair of light-guide containers 204 that respectively accommodate the paired light guides 110, the through-hole 210 that extends through in the propagation direction of reflected light reflected off the document G (referred to as "a light propagation direction" below), and containers 230 (refer to FIG. 10) that accommodate the rigid substrates 106. In the present exemplary embodiment, the light propagation direction corresponds to the height direction. The through-hole 210 is an example of a hole.

As illustrated in FIG. 9, the pair of light-guide containers 204 are arranged side by side in the apparatus width direction. The body 202 accommodates support plates 206 that support the respective light guides 110 from below, and wall plates 208 that each hold the light guide 110 between itself and the body 202 in the apparatus width direction. The apparatus width direction is an example of a width direction.

The pair of wall plates 208 are spaced apart in the apparatus width direction. The area (space) held between the pair of wall plates 208 serves as the hole upstream portion 210*a* of the through-hole 210 located upstream in the light propagation direction. The upstream end of the hole upstream portion 210*a* in the light propagation direction has the smallest width among other portions, and the upstream end of the through-hole 210 in the light propagation direction serves as the slit 222 that restricts part of reflected light reflected off the document G. The slit 222 is an example of an opening.

On the inner circumferential surfaces defining the through-hole 210 of the upper housing 200, at least portions irradiated with reflected light reflected off the document G are embossed. The portions irradiated with reflected light refer to the surfaces of the upper housing 200 defining the hole upstream portion 210*a* (the surfaces of the pair of wall plates 208 facing inward in the apparatus width direction). Embossing refers to a design with recesses and projections formed on the surface with a depth of greater than or equal to 2 μm.

The upper housing 200 has upward surfaces 280 facing upstream in the light propagation direction at the peripheral portion of the slit 222. The upward surfaces 280 are embossed.

The area surrounded by the body 202 and located below the support plates 206 is defined as a hole downstream portion 210*b*, or a downstream portion of the through-hole 210 in the light propagation direction.

Lower Housing 240

The lower housing 240 is formed from resin, such as modified-polyphenyleneether resin (m-PPE) by molding (such as injection molding). As illustrated in FIG. 9 and FIG. 10, the lower housing 240 includes a body 242 and a base end portion 260. The body 242 has its upper end portion located at the hole downstream portion 210*b* formed in the body 202 of the upper housing 200, and supports the condenser 112. The base end portion 260 is coupled to the lower end of the body 242, and has a container 262 that accommodates the light receiving substrate 102.

The body 242 has a rectangular cross section extending in the height direction. The through-hole 244 extends through the body 242 and the base end portion 260 in the light propagation direction, and the condenser 112 is disposed at the upper end portion of the through-hole 244. More specifically, in the condenser 112, the lower end portion of the first lens array 152 and the entirety of the second lens array 152 are located at the upper end portion of the through-hole 244, and held by opposing surfaces 244*b* defining the through-hole 244 and opposing in the apparatus width direction. In other words, the pair of lens arrays 152 are held by the opposing surfaces 244*b* defining the through-hole 244 formed in the body 242. The through-hole 244 formed in the resin-made body 242 is long and extends in the apparatus depth direction. Thus, the through-hole 244 is warped by, for example, mold shrinkage to have its width at the center portion in the apparatus depth direction reduced further than its width at the end portions (both end portions) in the apparatus depth direction. When the pair of lens arrays 152 are inserted into this through-hole 244, the pair of lens arrays 152 are held by the opposing surfaces 244*b* defining the through-hole 244. The pair of lens arrays 152 inserted into the through-hole 244 then correct the opposing surfaces 244*b* to reduce the warpage, and thus, also correct outer peripheral surfaces 246 of the body 242 to reduce the warpage.

The through-hole 244 has a step portion 244*a* that receives the end portions (ridges 156) of the second lens array 152.

The base end portion 260 has a rectangular cross section extending in the apparatus width direction, and the base end portion 260 has the container 262 that accommodates the light receiving substrate 102. The container 262 has the spot-facing surface 262*a* with which the upper surface of the light receiving substrate 102 comes into contact. The light receiving substrate 102 is fastened to the lower housing 240 with an adhesive (not illustrated) applied across the light receiving substrate 102 and the spot-facing surface 262*a*.

Positioning of Upper Housing 200 and Lower Housing 240 in Apparatus Depth Direction Subsequently, positioning of the upper housing 200 and the lower housing 240 in the apparatus depth direction is described.

Figure 19:
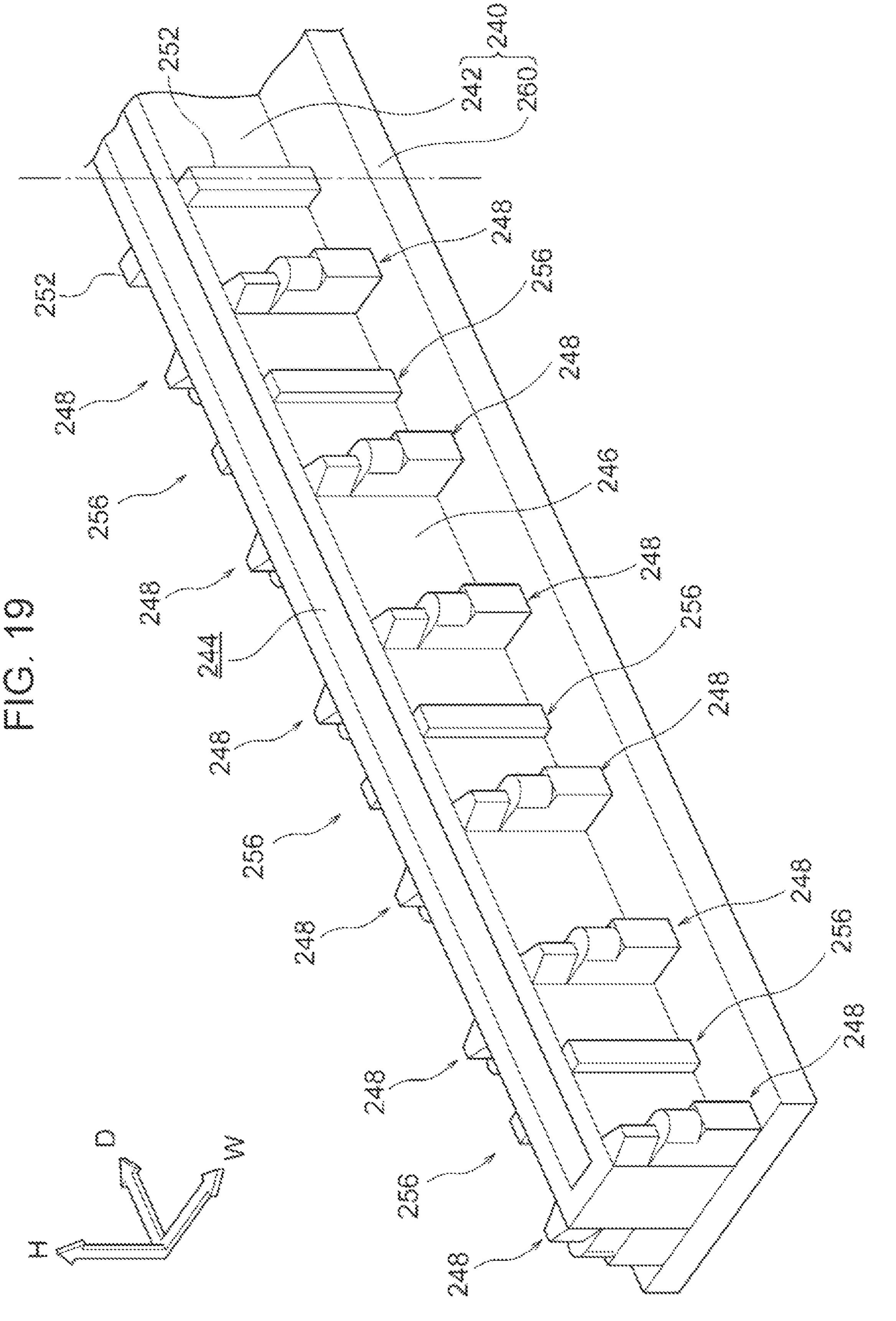
FIG. 19 is a perspective view of a lower housing included in the image reading device according to the exemplary embodiment of the present disclosure.

As illustrated in FIG. 19, projections 252 protrude outward in the apparatus width direction from the pair of outer peripheral surfaces 246 of the body 242 of the lower housing 240, facing outward in the apparatus width direction. The projections 252 are located at the center portion of the body 242 in the apparatus depth direction. Here, provided that the length of the body 242 in the apparatus depth direction is 10, the center portion of the body 242 in the apparatus depth direction is within a range of 4 to 6 from the end portions. The paired projections 252 overlap one another (located at the equivalent or same position) when seeing through the body 242 in the apparatus width direction.

Figure 21B:
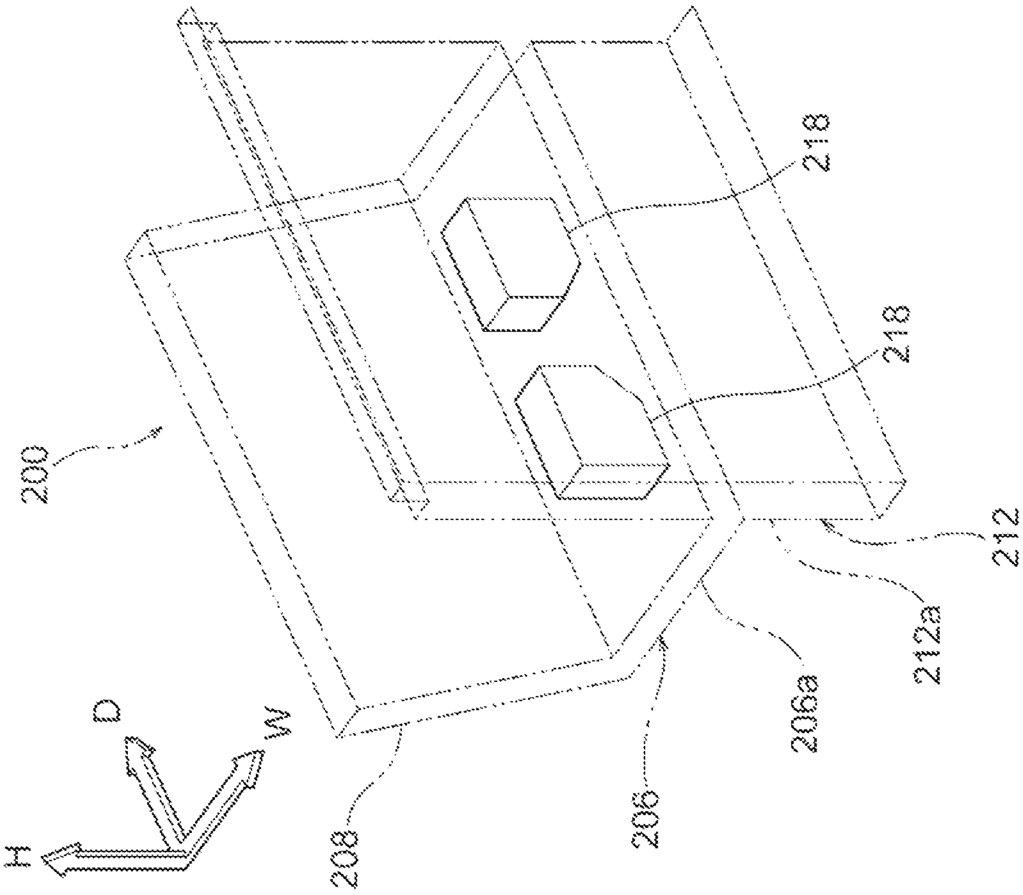
FIGS. 21A and 21B are perspective views of positioning components that fix, in an apparatus depth direction, the positions of an upper housing and a lower housing included in the image reading device according to the exemplary embodiment of the present disclosure.
Figure 21A:
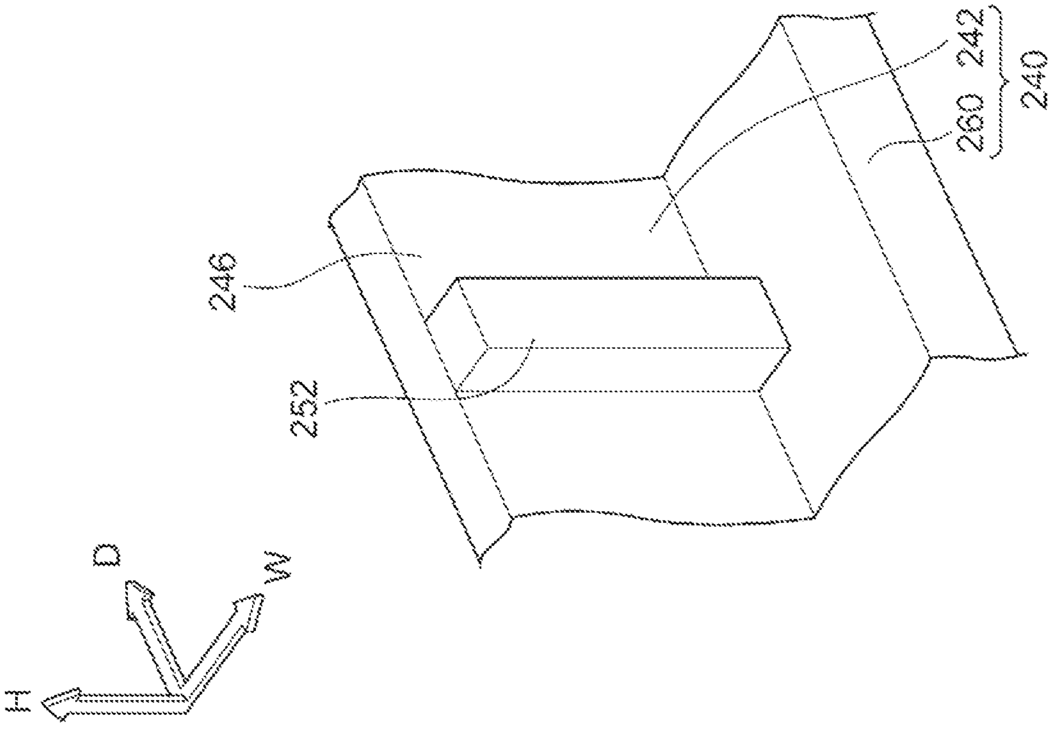

As illustrated in FIG. 21A, the projections 252 extend in the height direction and have a rectangular cross section.

Figure 20:
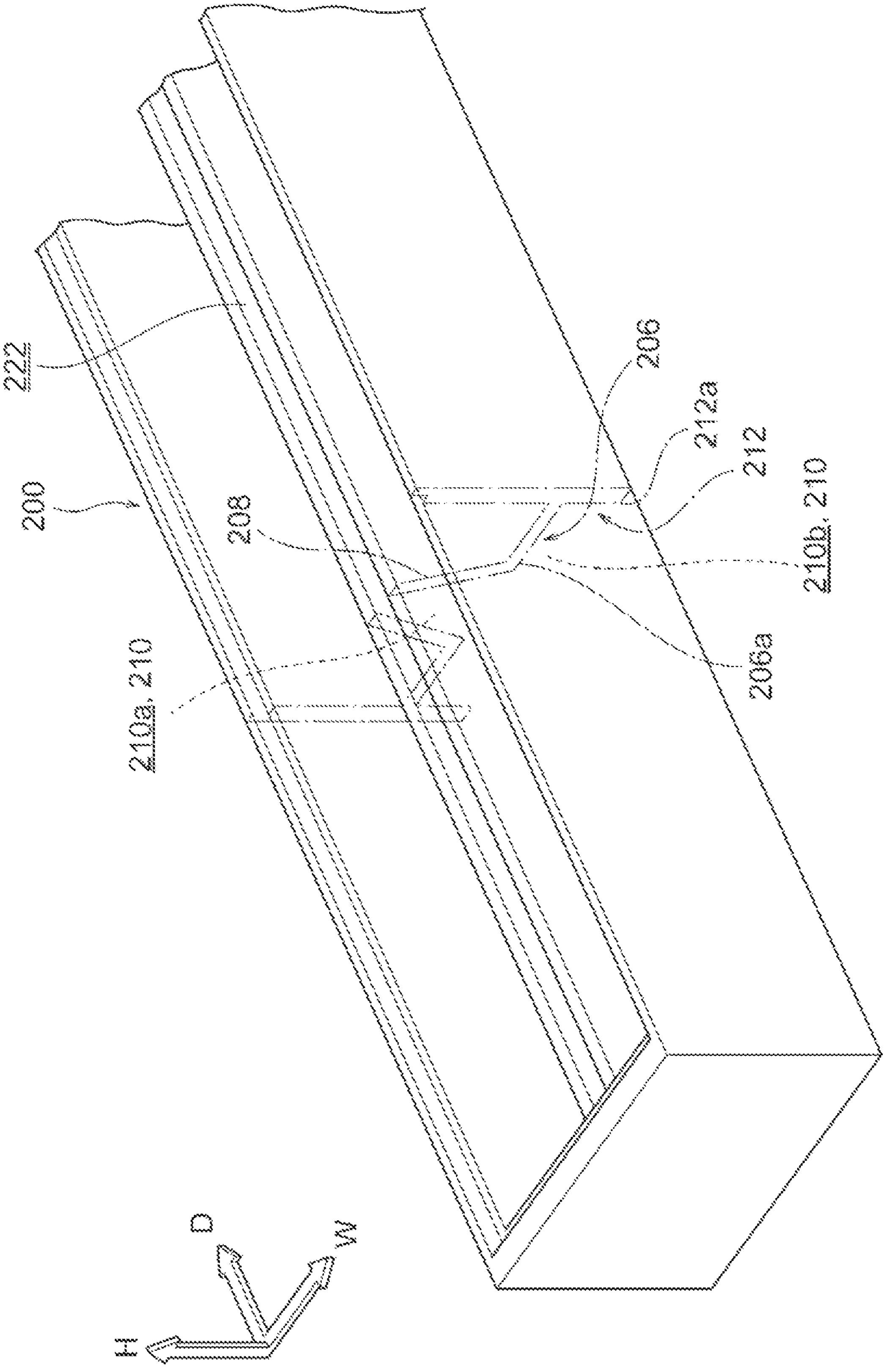
FIG. 20 is a perspective view of an upper housing included in the image reading device according to the exemplary embodiment of the present disclosure.

As illustrated in FIG. 20, the upper housing 200 includes the pair of support plates 206 extending in the apparatus depth direction, and a pair of wall plates 212 that hold the hole downstream portion 210*b* in between in the apparatus width direction. Each of the support plates 206 has a lower surface 206*a* facing downward. Each of the wall plates 212 has an inner circumferential surface 212*a* defining the hole downstream portion 210*b*.

As illustrated in FIG. 21B, the upper housing 200 also includes a pair of holders 218 that protrude downward from the lower surface 206*a* of each support plate 206. The pair of holders 218 hold one projection 252 of the lower housing 240 in between in the apparatus depth direction. The lower end portion of each holder 218 is tapered to serve as a guide. FIG. 21B simply illustrates the pair of holders 218 on one side (front side) of the upper housing 200 in the apparatus width direction, but the pair of holders 218 are also disposed on the other side (rear side) of the upper housing 200 in the apparatus width direction. In other words, these two pairs of holders 218 overlap each other (are located at the equivalent or the same position) when seeing through the upper housing 200 in the apparatus width direction.

Figure 22:
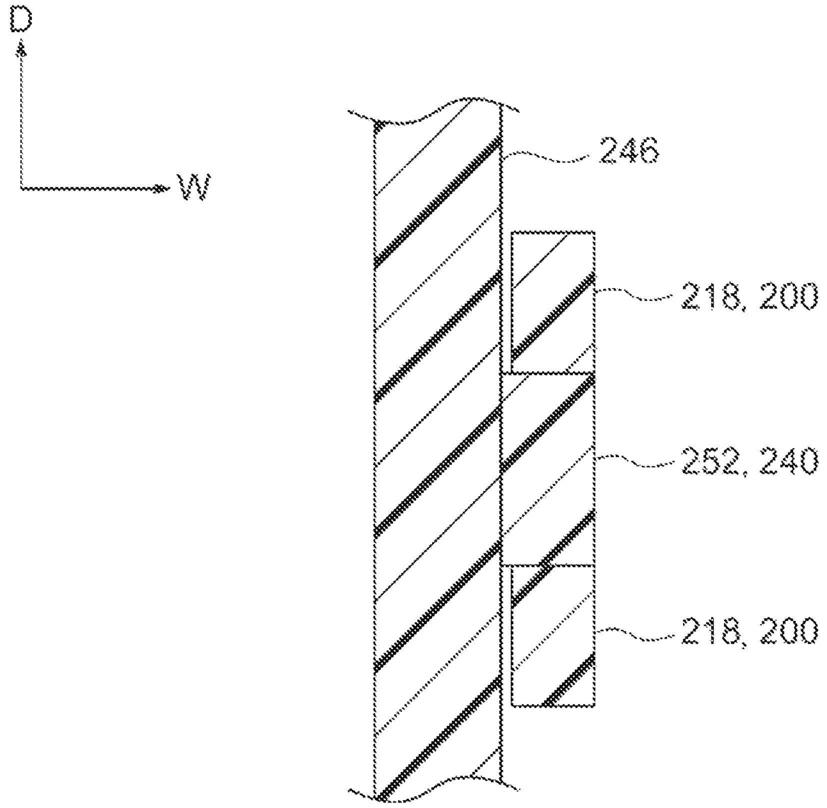
FIG. 22 is a cross-sectional view of positioning components that fix, in the apparatus depth direction, the positions of the upper housing and the lower housing included in the image reading device according to the exemplary embodiment of the present disclosure.

As illustrated in FIG. 22, when the upper housing 200 and the lower housing 240 are combined, each projection 252 of the lower housing 240 is held by the corresponding pair of holders 218 in between in the apparatus depth direction. Thus, the upper housing 200 and the lower housing 240 are fixed in position in the apparatus depth direction. Although FIG. 22 illustrates the state where the projection 252 formed on one of the outer peripheral surfaces 246 of the lower housing 240 is held in between the pair of holders 218 disposed on one of the lower surfaces 206*a* of the upper housing 200, the projection 252 formed on the other one of the outer peripheral surfaces 246 of the lower housing 240 is similarly held in between the pair of holders 218 disposed on the other one of the lower surfaces 206*a* of the upper housing 200.

Positioning of Upper Housing 200 and Lower Housing 240 in Apparatus Width Direction and Height Direction Subsequently, positioning of the upper housing 200 and the lower housing 240 in the apparatus width direction and the height direction is described with reference to FIGS. 23A and 23B and other drawings. Although FIGS. 23A and 23B illustrate one protrusion 248 and one protrusion 216, other protrusions 248 and other protrusions 216 have the same or equivalent structures.

As illustrated in FIG. 19, the protrusions 248 protrude outward in the apparatus width direction from the pair of outer peripheral surfaces 246 of the body 242 of the lower housing 240 facing outward in the apparatus width direction. These protrusions 248 are arranged at intervals in the apparatus depth direction.

Figure 23B:
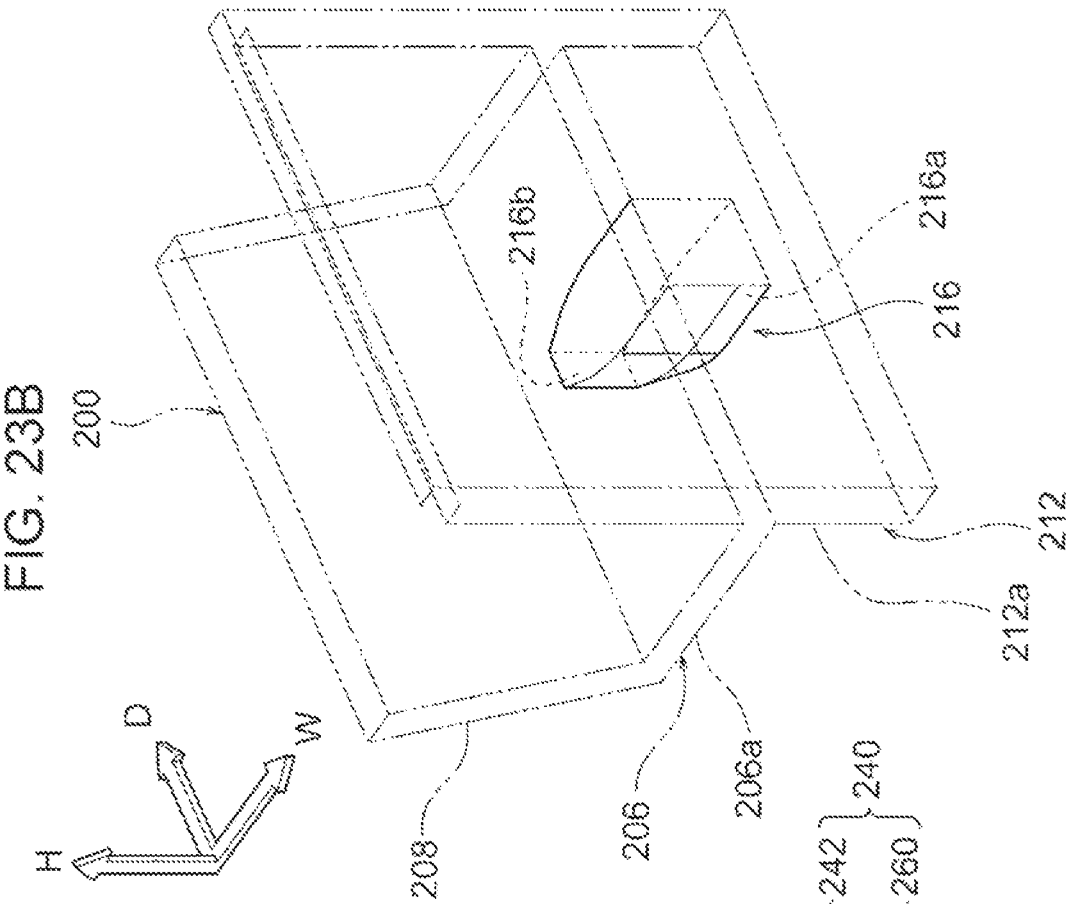
FIGS. 23A and 23B are perspective views of the positioning components that fix, in an apparatus width direction, the positions of the upper housing and the lower housing included in the image reading device according to the exemplary embodiment of the present disclosure.
Figure 23A:
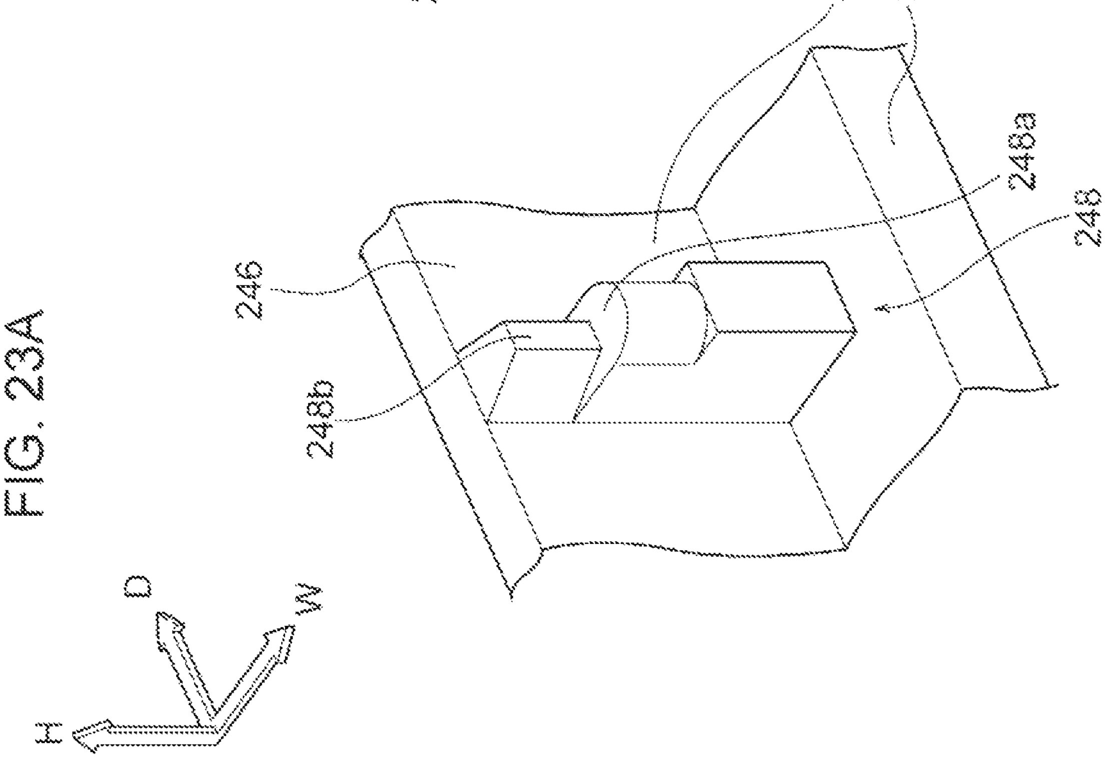

As illustrated in FIG. 23A, each protrusion 248 has an upward surface 248*a*, facing upward, at its lower portion. The protrusion 248 protrudes a smaller distance (a distance by which the protrusion 248 protrudes outward in the apparatus width direction from the outer peripheral surfaces 246) at an upper portion than at the lower portion. In other words, the lower portion of the protrusion 248 has the upward surface 248*a* facing upstream in the light propagation direction. The upper portion of the protrusion 248 has an outward surface 248*b* facing outward in the apparatus width direction. The upward surface 248*a* is an example of a first surface.

As illustrated in FIG. 23B, at a portion of the upper housing 200 facing each protrusion 248 of the lower housing 240 in the apparatus width direction, a protrusion 216 protrudes inward in the apparatus width direction from the lower surface 206*a* of the support plate 206 and the inner circumferential surface 212*a* of the wall plate 212. In other words, the protrusion 216 protrudes from the lower surface 206*a* of the support plate 206 and the inner circumferential surface 212*a* of the wall plate 212. The protrusion 216 is an example of a second protrusion.

The lower portion of each protrusion 216 is tapered, and has a downward surface 216*a* facing downward. In other words, the lower portion of each protrusion 216 has a downward surface 216*a* facing downstream in the light propagation direction. The upper portion of each protrusion 216 has an inward surface 216*b* facing inward in the apparatus width direction. The downward surface 216*a* is an example of a second surface.

As described above, the upper housing 200 having the slit 222 is formed from a resin material by, for example, injection molding. Thus, the upper housing 200 alone is warped due to, for example, mold shrinkage, and the width of the slit 222 (refer to FIG. 20) at the center portion in the apparatus depth direction is narrower than the width of the slit 222 at end portions (both end portions) in the apparatus depth direction.

Figure 24:
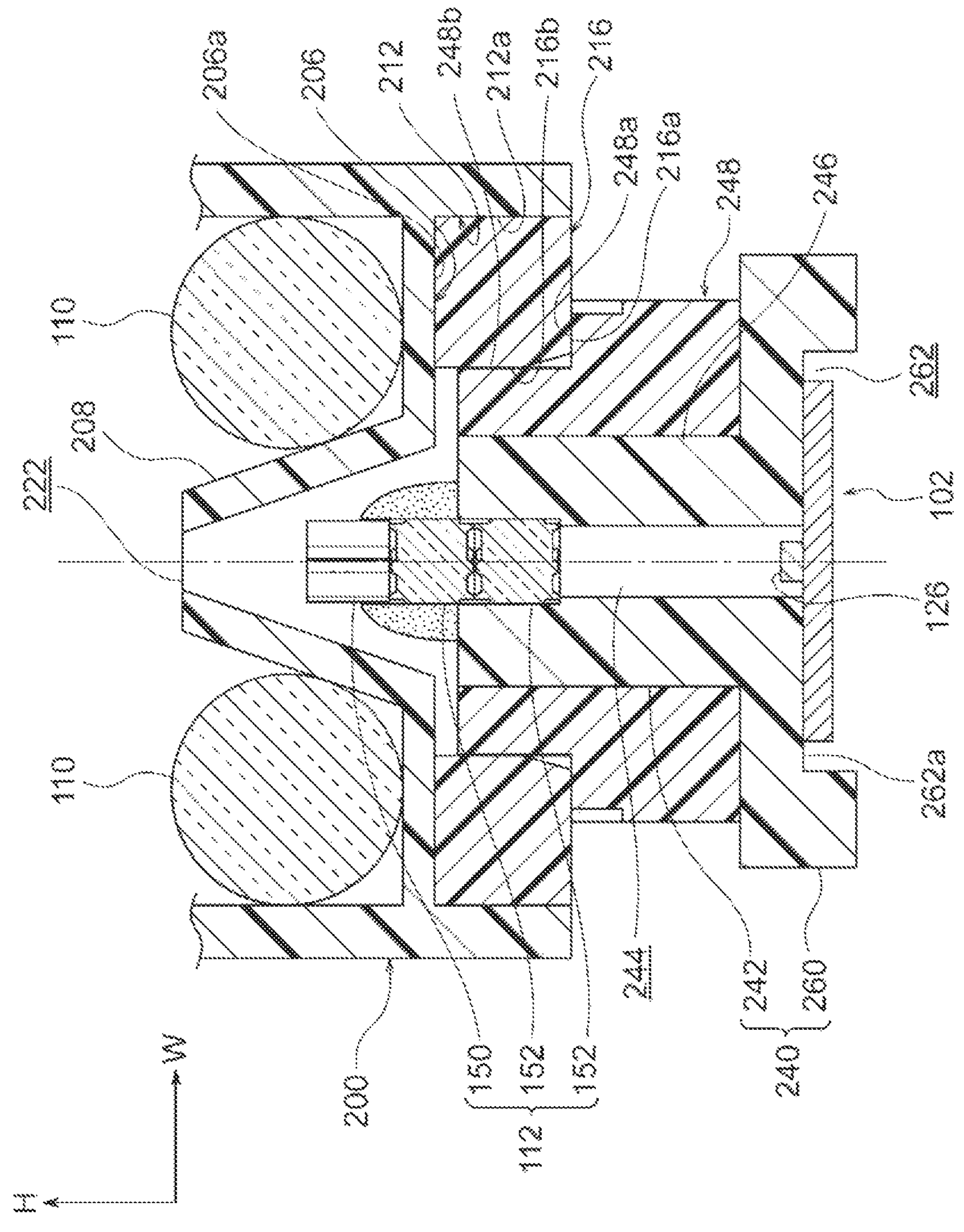
FIG. 24 is a cross-sectional view of the positioning components that fix, in the apparatus width direction, the positions of the upper housing and the lower housing included in the image reading device according to the exemplary embodiment of the present disclosure.

As illustrated in FIG. 24, the upper housing 200 and the lower housing 240 are combined while bringing the outward surface 248*b* of each protrusion 248 of the lower housing 240 and the inward surface 216*b* of the corresponding protrusion 216 of the upper housing 200 into contact with each other in the apparatus width direction. Thus, the upper housing 200 and the lower housing 240 are fixed in position in the apparatus width direction, and the warpage of the upper housing 200 is corrected. Thus, the width of the slit 222 is corrected to be uniform throughout in the apparatus depth direction.

The upward surface 248*a* of each protrusion 248 of the lower housing 240 and the downward surface 216*a* of the corresponding protrusion 216 of the upper housing 200 are in contact with each other in the height direction. Thus, the upper housing 200 and the lower housing 240 are fixed in position in the height direction.

Bonding of Upper Housing 200 and Lower Housing 240

Subsequently, bonding of the upper housing 200 and the lower housing 240 is described with reference to, for example, FIGS. 25A and 25B. Although FIGS. 25A and 25B illustrate one protrusion 256 and a cover 220, other protrusions 256 and covers 220 have the same structure.

As illustrated in FIG. 19, the protrusions 256 protrude outward in the apparatus width direction from the pair of outer peripheral surfaces 246 of the body 242 of the lower housing 240 facing outward in the apparatus width direction. These protrusions 256 are arranged at intervals in the apparatus depth direction, and each disposed between the paired protrusions 248. In other words, each protrusion 256 is disposed between the two protrusions 248 adjacent in the apparatus depth direction while being spaced apart from the protrusions 248 in the apparatus depth direction.

Figure 25B:
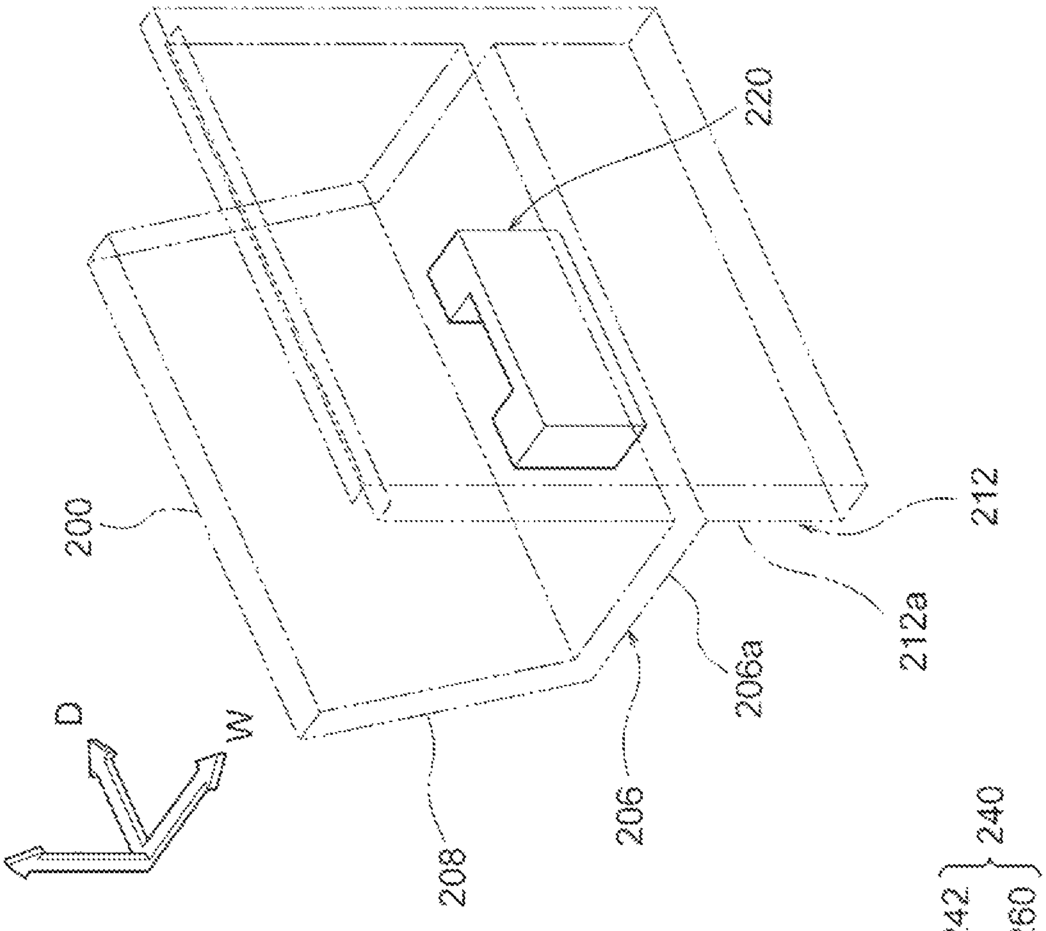
FIGS. 25A and 25B are perspective views of bonded portions of the upper housing and the lower housing included in the image reading device according to the exemplary embodiment of the present disclosure.
Figure 25A:
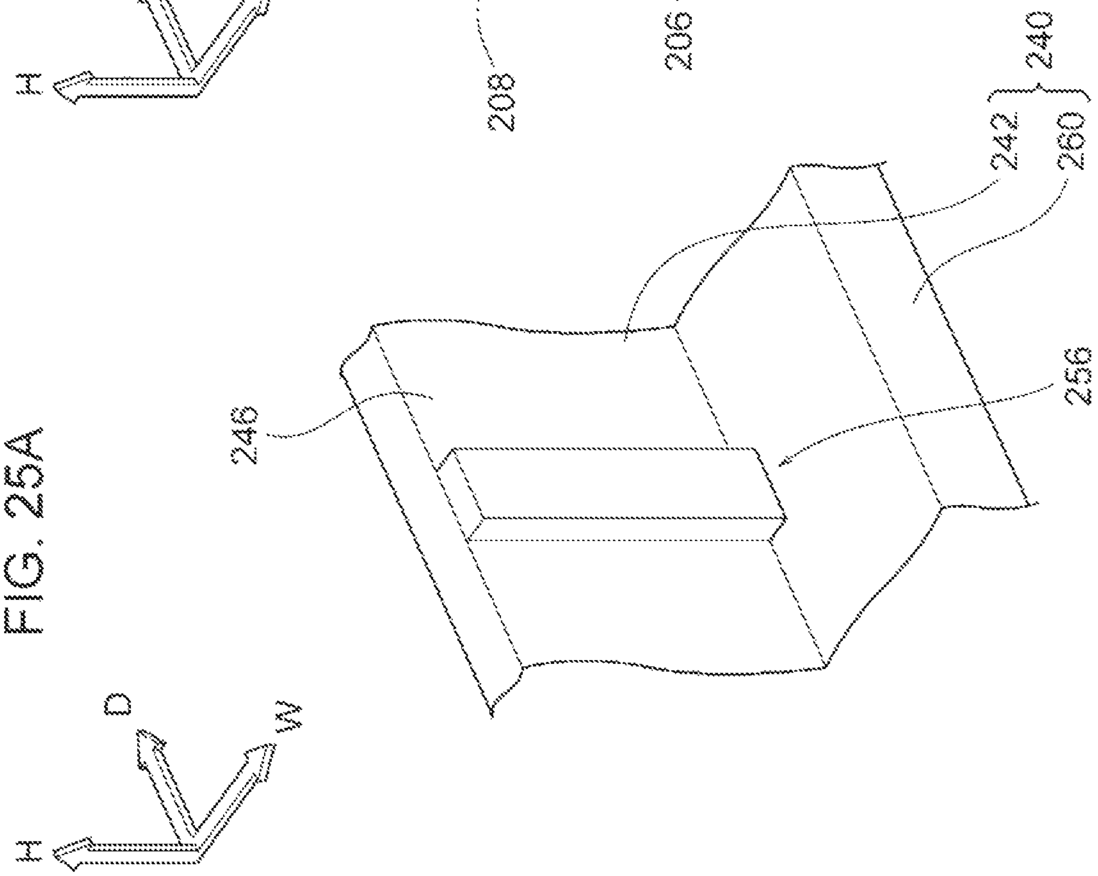

As illustrated in FIG. 25A, the protrusions 256 extend in the height direction, and have a rectangular cross section.

As illustrated in FIG. 25B, the upper housing 200 includes multiple recessed covers 220 that protrude downward from the lower surface 206*a* of the support plate 206 to cover the protrusions 256 of the lower housing 240 from the outer side in the apparatus width direction and both sides in the apparatus depth direction.

Figure 26A:
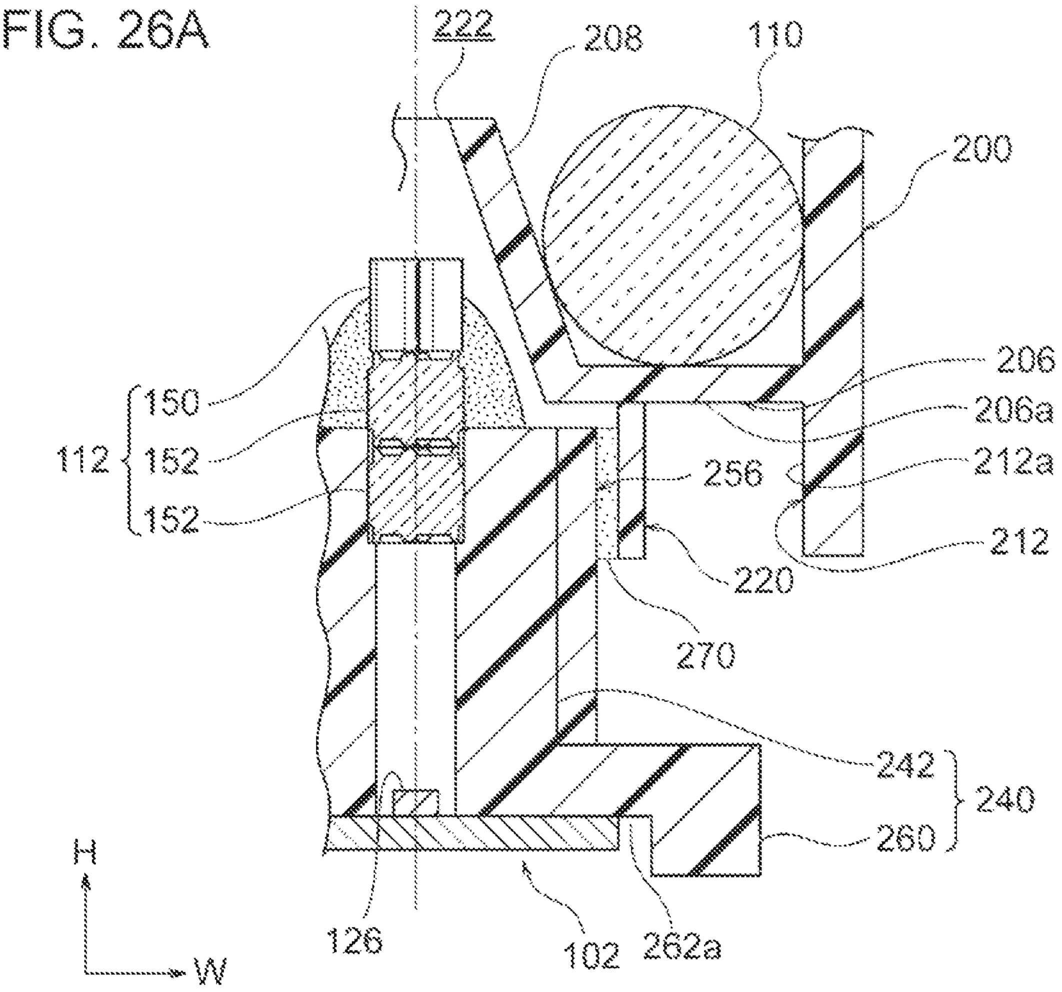
FIGS. 26A and 26B are cross-sectional views of the bonded portions of the upper housing and the lower housing included in the image reading device according to the exemplary embodiment of the present disclosure.
Figure 26B:
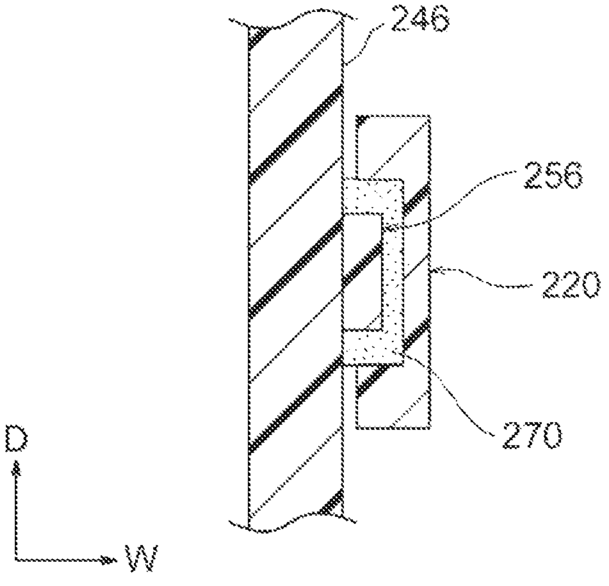

When the upper housing 200 and the lower housing 240 are combined, as illustrated in FIGS. 26A and 26B, the cover 220 covers the upper portion of the protrusion 256 while leaving a gap from the outer side in the apparatus width direction and both sides in the apparatus depth direction. An adhesive 270 is filled in between each protrusion 256 and the corresponding cover 220 to bond the upper housing 200 and the lower housing 240 to each other.

Others

Subsequently, bonding of the first lens array 152 and the second lens array 152, bonding of the pair of lens arrays 152 and the light-shielding member 150, and shielding of the condenser 112 and the lower housing 240, and other operations are described.

Bonding of First Lens Array 152 and Second Lens Array 152

As illustrated in FIG. 15, the vertices of the ridges 154 and 156 of the lens arrays 152 are abutted against each other while overlapping the optical axes of the microlenses 164 (refer to FIG. 14) of the first lens array 152 and the optical axes of the microlenses 164 of the second lens array 152 with each other. The paired lens arrays 152 are fastened in this state with the adhesive 130 (refer to FIG. 15). The adhesive 130 is an example of a second adhesive.

Figure 27A:
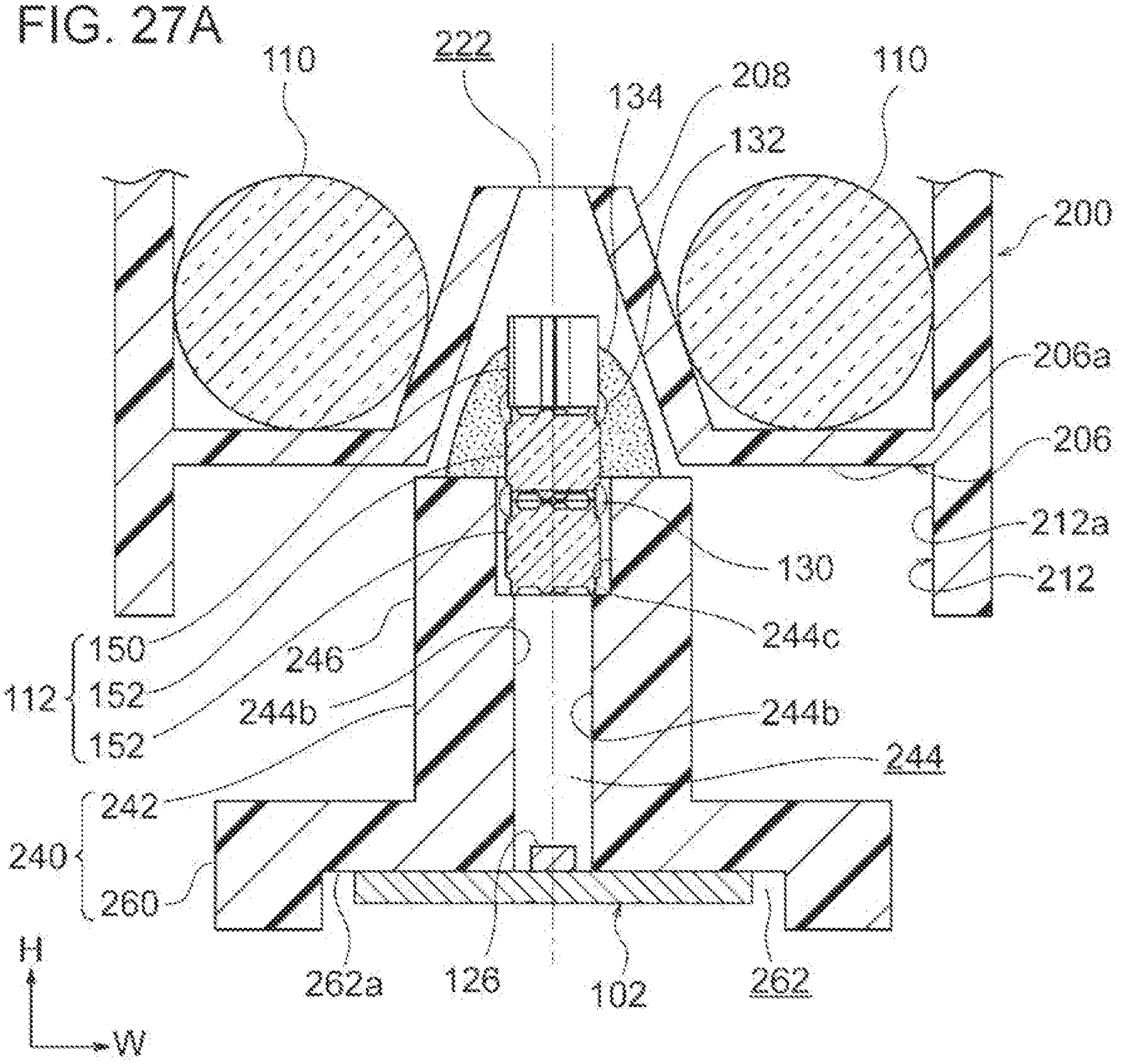
FIGS. 27A and 27B are cross-sectional views of bonded portions where one lens array included in the image reading device according to the exemplary embodiment of the present disclosure is bonded to another lens array.

More specifically, as illustrated in FIG. 27A, the adhesive 130 is applied across the lower end portion on the side surface of the first lens array 152 and the upper end portion on the side surface of the second lens array 152. As illustrated in FIG. 15, the adhesive 130 is applied at multiple portions spaced apart from each other in the apparatus depth direction to protrude from the side surfaces of the pair of lens arrays 152 in the apparatus width direction.

Figure 27B:
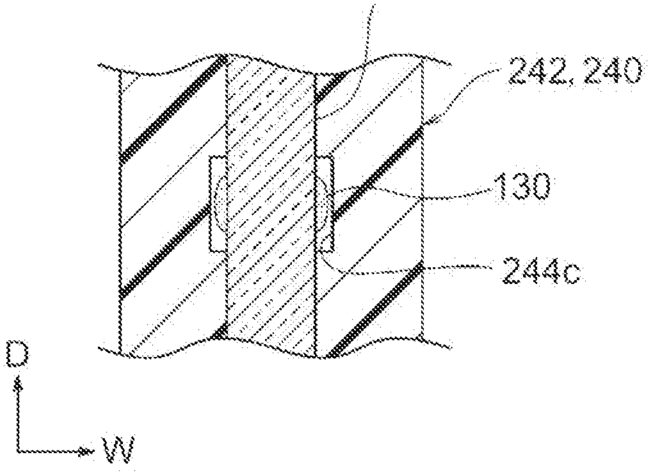

As illustrated in FIGS. 27A and 27B, the opposing surfaces 244*b* that oppose in the apparatus width direction across the through-hole 244 each have multiple recesses 244*c* to form gaps between the opposing surfaces 244*b* and the adhesive 130. In other words, the lower housing 240 has multiple recesses 244*c* to form gaps between the opposing surfaces 244*b* and the adhesive 130 at portions on the opposing surfaces 244*b* corresponding to the positions of the adhesive 130 on the pair of lens arrays 152 inserted into the through-hole 244.

Bonding of Pair of Lens Arrays 152 and Light-Shielding Member 150

As illustrated in FIG. 15, the light-shielding member 150 is fastened to the lens arrays 152 with an adhesive 132 (refer to FIG. 15) to overlap the multiple through-holes 170 of the light-shielding member 150 in one-to-one correspondence with the multiple microlenses 164 (refer to FIG. 12) formed on the lens arrays 152 when viewed from above. The adhesive 132 is disposed at multiple portions while being spaced apart from each other in the apparatus depth direction and protruding from the light-shielding member 150 in the apparatus width direction. FIG. 15 simply illustrates the adhesive 130 and the adhesive 132 on a first side in the apparatus width direction, but the adhesive 130 and the adhesive 132 are also applied to a second side (opposite side) in the apparatus width direction not illustrated in FIG. 15, at the same positions as those on the first side in the apparatus width direction.

Shielding of Condenser 112 and Lower Housing 240

As illustrated in FIG. 27A, a sealant 134 is applied along the outer periphery of the condenser 112 across the upper surface of the body 242 of the lower housing 240 and the side surface of the condenser 112 to seal the condenser 112 and the lower housing 240. The sealant 134 and the condenser 112 are spaced apart from the inner circumferential surfaces of the wall plates 208 of the upper housing 200 facing inward in the apparatus width direction. This spacing is provided to reduce inclination of the optical axis of the condenser 112 as a result of the sealant 134 or the condenser 112 coming into contact with the inner circumferential surfaces of the wall plates 208 facing inward in the apparatus width direction. The sealant 134 is an elastic member with an Asker hardness of smaller than or equal to 50 degrees.

Assembly Process

Figure 28:
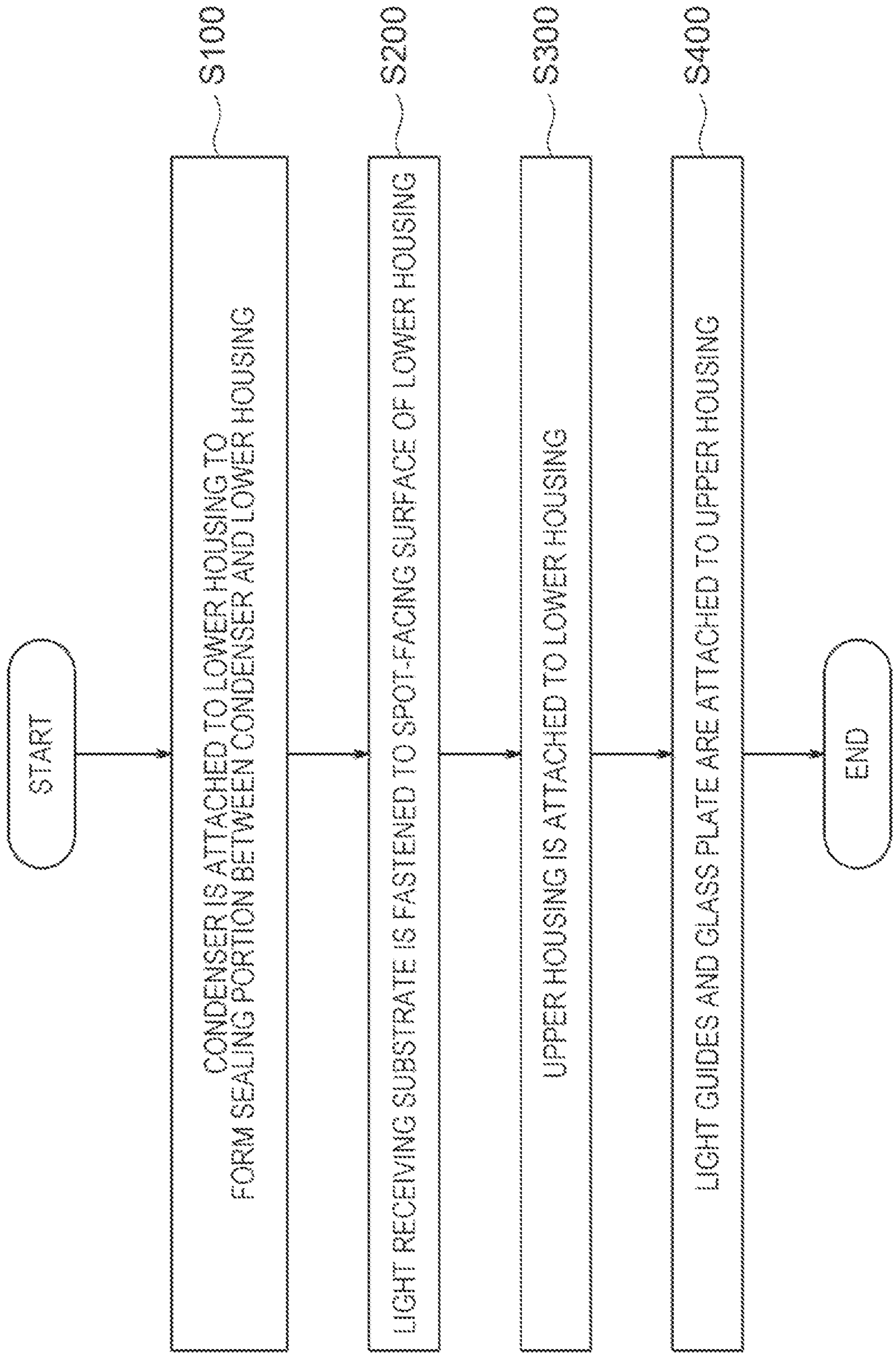
FIG. 28 is a flowchart of an assembly process of assembling the image reading device according to the exemplary embodiment of the present disclosure.

Subsequently, a process of assembling the image reading device 100 is described with reference to the flowchart illustrated in FIG. 28.

Figure 29A:
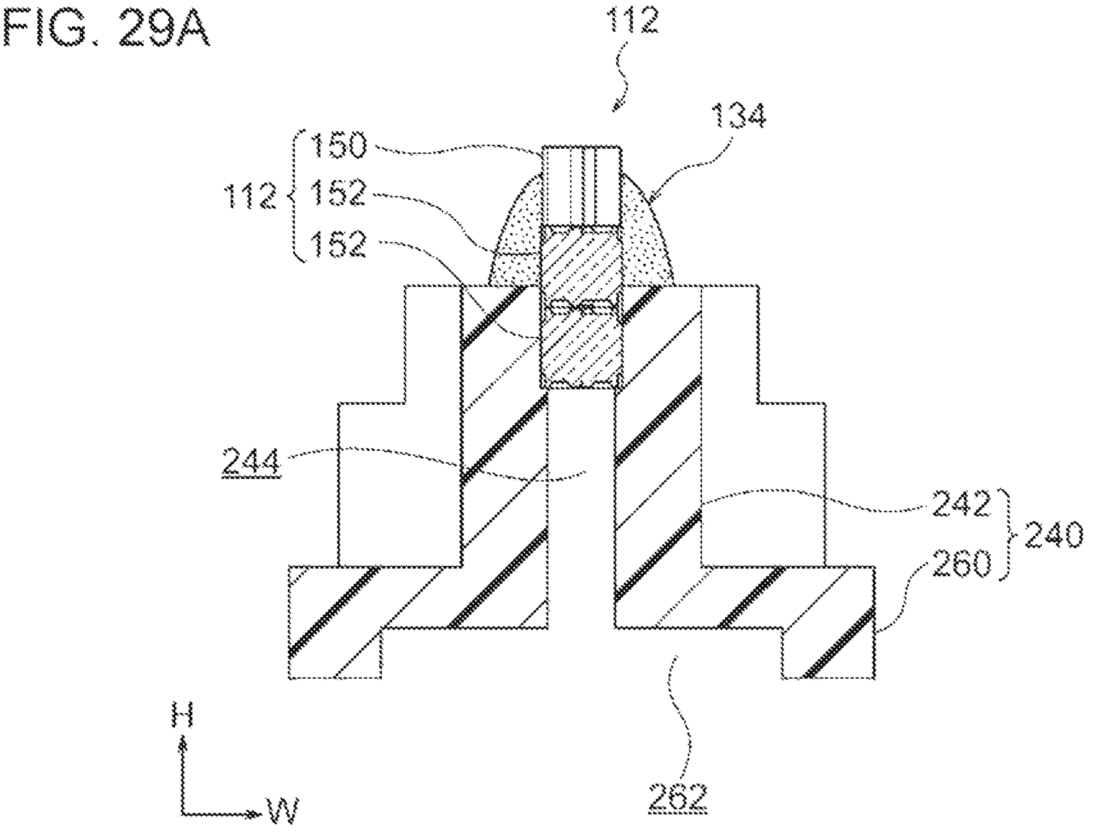
FIGS. 29A and 29B are diagrams illustrating the assembly process of assembling the image reading device according to the exemplary embodiment of the present disclosure.

First, in step S100, as illustrated in FIG. 29A, the condenser 112 is attached to the lower housing 240, and then the condenser 112 and the lower housing 240 are sealed.

As described above, the lower housing 240 is formed by, for example, injection molding from a resin material. Thus, in the lower housing 240 alone, the width of the through-hole 244 at the center portion in the apparatus depth direction is narrower than the width of the through-hole 244 at end portions (both end portions) in the apparatus depth direction due to, for example, mold shrinkage. In other words, the pair of opposing surfaces 244*b* defining the through-hole 244 are warped into an arch. The pair of opposing surfaces 244*b* warped into an arch cause the pair of outer peripheral surfaces 246 of the body 242 to be warped to follow the contour of the opposing surfaces 244*b*. The condenser 112 is attached to the lower housing 240 while having the through-hole 244 widened with a jig not illustrated. More specifically, the lower portion of the condenser 112 is inserted into the through-hole 244 while the center portion of the through-hole 244 is widened with a jig not illustrated, and the lower housing 240 has its width restored from the widened state. Then, the condenser 112 is held in between the pair of opposing surfaces 244*b* defining the through-hole 244 of the lower housing 240. Thus, the pair of opposing surfaces 244*b* are corrected to reduce the warpage. The correction of the warped opposing surfaces 244*b* corrects the outer peripheral surfaces 246 to reduce the warpage. Thereafter, the sealant 134 is applied across the upper surface of the body 242 of the lower housing 240 and the side surface of the condenser 112, and solidifies to form a sealing portion.

Figure 29B:
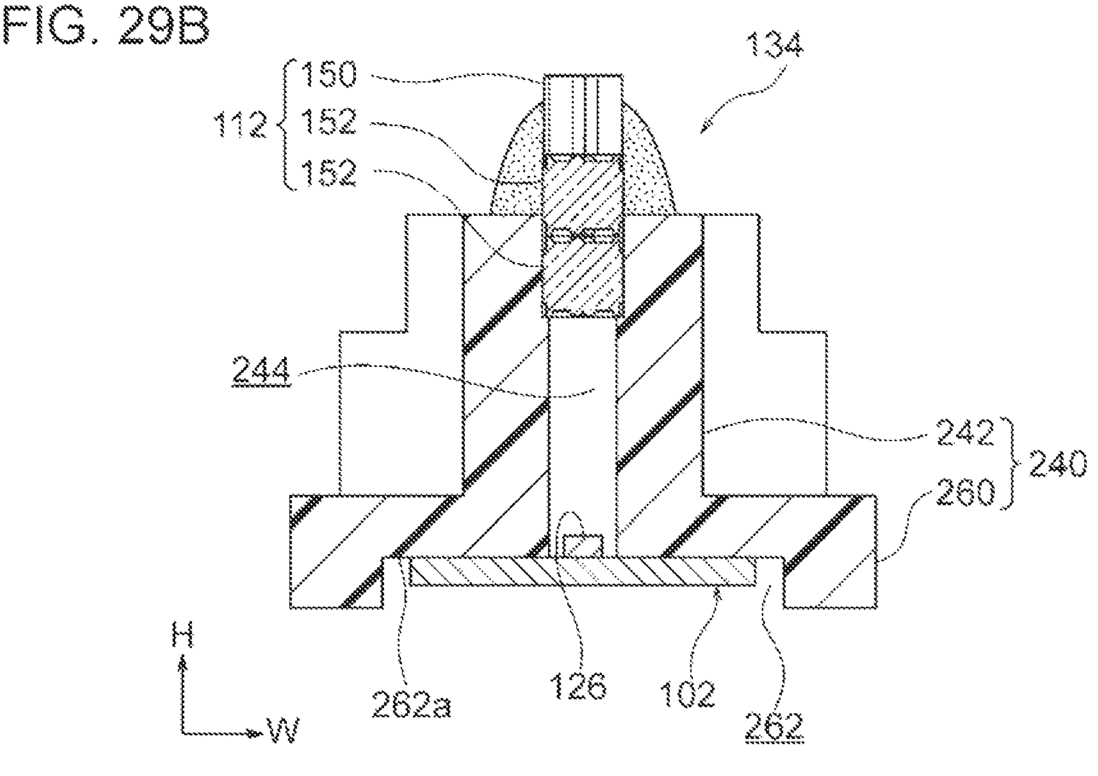

Subsequently, as illustrated in FIG. 29B, in step S200, the light receiving substrate 102 is fastened to the lower housing 240 with an adhesive (not illustrated) applied across the light receiving substrate 102 and the spot-facing surface 262*a* while being in contact with the spot-facing surface 262*a* of the lower housing 240.

Figure 30A:
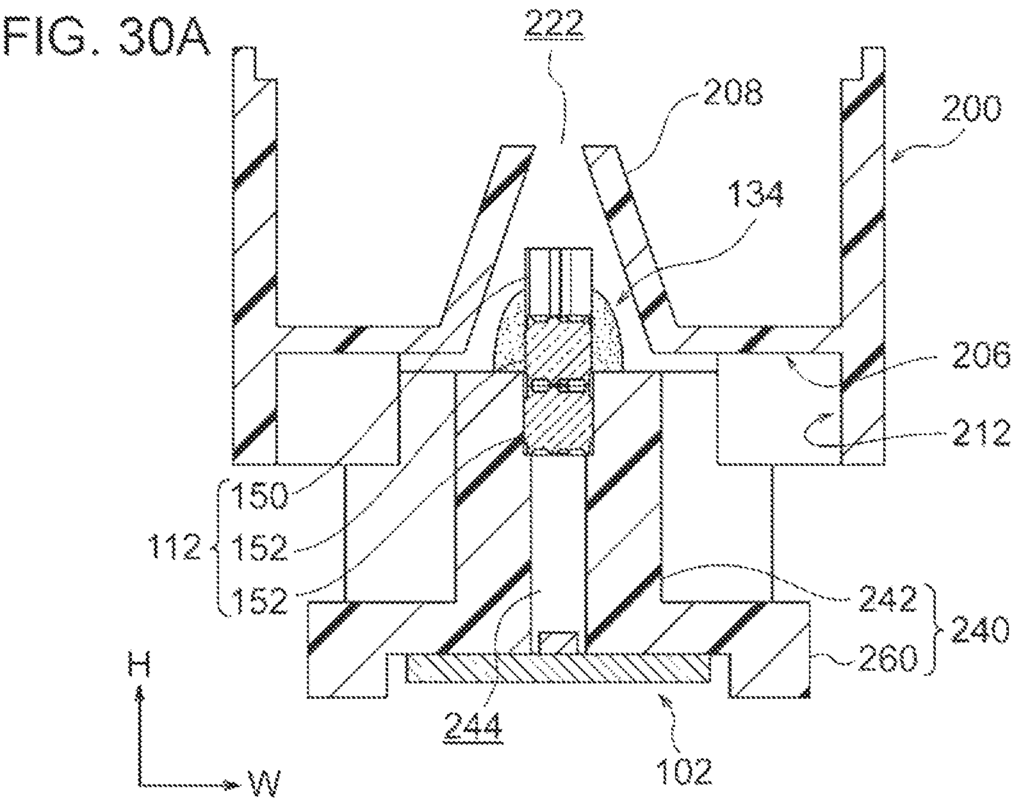
FIGS. 30A and 30B are diagrams illustrating the assembly process of assembling the image reading device according to the exemplary embodiment of the present disclosure.

Subsequently, as illustrated in FIG. 30A, in step S300, the upper housing 200 is attached to the lower housing 240.

As described above, the upper housing 200 is formed from a resin material by, for example, injection molding. Thus, in the upper housing 200 alone, the width of the slit 222 at the center portion in the apparatus depth direction is narrower than the width of the slit 222 at end portions (both end portions) in the apparatus depth direction due to, for example, mold shrinkage. Thus, the upper housing 200 is attached to the lower housing 240 while having the slit 222 widened with a jig not illustrated. More specifically, the body 242 of the lower housing 240 is inserted into the through-hole 210 while the center portion of the through-hole 210 is widened with a jig not illustrated, and the through-hole 210 has its width restored from the widened state.

In the state where the upper housing 200 is attached to the lower housing 240 (when the body 242 of the lower housing 240 is inserted into the through-hole 210 while the center portion of the through-hole 210 is widened), as illustrated in FIG. 22, each projection 252 of the lower housing 240 is held in between the pair of holders 218 of the upper housing 200 in the apparatus depth direction. Thus, the upper housing 200 and the lower housing 240 are fixed in position in the apparatus depth direction.

When the body 242 of the lower housing 240 is kept being inserted into the through-hole 210 while the center portion of the through-hole 210 is widened, as illustrated in FIG. 24, the upward surface 248*a* of each protrusion 248 on the lower housing 240 and the downward surface 216*a* of the corresponding protrusion 216 on the upper housing 200 come into contact with each other in the height direction. Thus, the upper housing 200 and the lower housing 240 are fixed in position in the height direction.

Thereafter, when the center portion of the through-hole 210 is restored from the widened state, the outward surface 248*b* of each protrusion 248 on the lower housing 240 and the inward surface 216*b* of the corresponding protrusion 216 on the upper housing 200 come into contact with each other in the apparatus width direction. Thus, the upper housing 200 and the lower housing 240 are fixed in position in the apparatus width direction, and the width of the slit 222 is corrected. Specifically, the width of the slit 222 is restored to be uniform throughout in the apparatus depth direction.

After the upper housing 200 and the lower housing 240 are fixed in position in three directions (the apparatus depth direction, the height direction, and the apparatus width direction), as illustrated in FIGS. 26A and 26B, the adhesive 270 is filled in between the protrusion 256 of the lower housing 240 and the cover 220 of the upper housing 200 to bond the upper housing 200 and the lower housing 240 to each other.

Figure 30B:
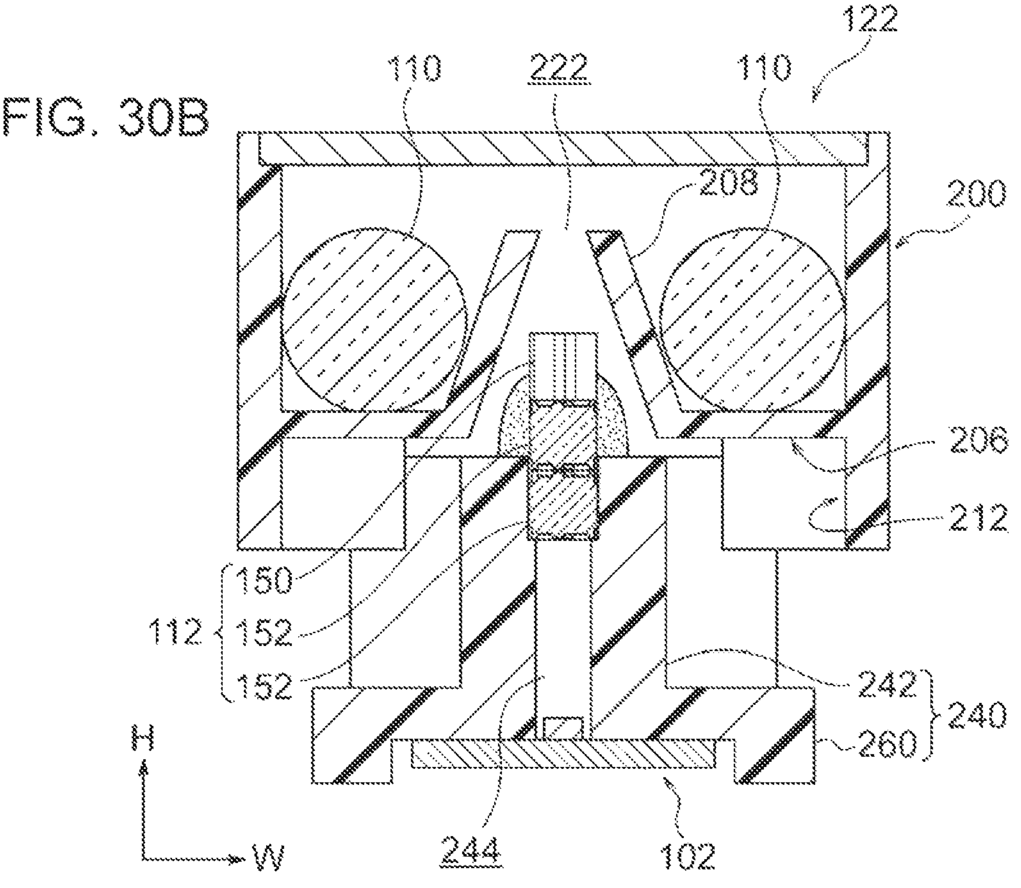

Subsequently, as illustrated in FIG. 30B, in step S400, the light guides 110 and the second glass plate 122 are attached to the upper housing 200. Thus, the image reading device 100 is assembled.

Operations

Subsequently, the operations of the image reading device 100 are described.

The light emitting elements 128 illustrated in FIG. 10 emit light to the end surfaces 110*a* of the light guides 110. The light guides 110 then guide the light incident on the end surfaces 110*a* of the light guides 110 in the longitudinal direction of the light guides 110. Then, as illustrated in FIG. 9, the light guides 110 emit light upward of the condenser 112 (in the direction of arrows B in the drawing).

Then, as illustrated in FIG. 9, part of reflected light emerging from the light guides 110, applied to the document G, and reflected off the document G passes through the slit 222. Part of the reflected light that has passed through the slit 222 passes through the through-holes 170 (refer to FIG. 17) of the light-shielding member 150 forming the condenser 112, and is incident on the microlenses 164 (refer to FIG. 14) of the first lens array 152.

Light incident on the microlenses 164 of the first lens array 152 emerges from the microlenses 164 of the first lens array 152, and is incident on the microlenses 164 of the second lens array 152. Light incident on the microlenses 164 of the second lens array 152 emerges from the microlenses 164 of the second lens array 152, and converges on the light receiving elements 126. Furthermore, the light receiving elements 126 receive the reflected light reflected off the document G and converts the light into electric signals.

Summarization

As described above, in the image reading device 100, the outward surface 248*b* of each protrusion 248 on the lower housing 240 comes into contact with the inward surface 216*b* of the corresponding protrusion 216 on the upper housing 200 in the apparatus width direction to correct the width of the slit 222. Thus, compared to the case where the upper housing 200 and the lower housing 240 come into contact with each other simply in the propagation direction of reflected light, the image reading device 100 reduces narrowing the width of the slit 222 at the center portion in the apparatus depth direction with respect to the width of the slit 222 at end portions in the apparatus depth direction.

In the image reading device 100, the upper housing 200 is black. In other words, of the inner circumferential surfaces of the through-hole 210 of the upper housing 200, at least the surfaces that define the hole upstream portion 210*a* or the portions that are irradiated with reflected light (the surfaces of the pair of wall plates 208 facing inward in the apparatus width direction) are black. Thus, compared to the case where the entirety of the upper housing is milky white, in the image reading device 100 with this structure, reflected light that has passed through the slit 222 and that is reflected off the surfaces of the pair of wall plates 208 defining the through-hole 210 facing inward in the apparatus width direction is less likely to serve as stray light that is transmitted through the pair of lens arrays 152.

In the upper housing 200 of the image reading device 100, at least the surfaces defining the hole upstream portion 210*a* that are irradiated with reflected light (the surfaces of the pair of wall plates 208 facing inward in the apparatus width direction) are embossed. Thus, compared to the case where the portions in the upper housing irradiated with reflected light are smooth surfaces, in the image reading device 100 with this structure, reflected light that has passed through the slit 222 and that is reflected off the surfaces of the pair of wall plates 208 defining the through-hole 210 facing inward in the apparatus width direction is less likely to serve as stray light that is transmitted through the pair of lens arrays 152.

In the image reading device 100, the upward surfaces 280 facing upstream in the light propagation direction are formed at the peripheral portion of the slit 222 formed in the upper housing 200. The upward surfaces 280 are black or embossed. Thus, compared to the case where the upward surface is milky white and smooth, the image reading device 100 with this structure reduces stray light caused when part of reflected light that is reflected off the document G (that undergoes first reflection) is reflected again off the upward surfaces 280 (that undergoes second reflection), and the reflected light that has undergone the second reflection is applied to the document G to serve as reflected light reflected off the document G (reflected light that undergoes third reflection). In other words, compared to the case where the upward surface is milky white and smooth, in the image reading device 100 with this structure, part of reflected light (reflected light resulting from third reflection) resulting from reflection (second reflection) off the upward surfaces 280 is less likely to serve as stray light that is transmitted through the pair of lens arrays 152.

In the image reading device 100, the outward surface 248*b* of each protrusion 248 on the lower housing 240 and the inward surface 216*b* of the corresponding protrusion 216 on the upper housing 200 come into contact with each other in the apparatus width direction. Thus, the upper housing 200 and the lower housing 240 are fixed in position in the apparatus width direction to correct the width of the slit 222. Thus, compared to a structure where a flat surface portion of the lower housing 240 facing inward and a flat surface portion of the upper housing 200 facing outward are brought into contact with each other to correct the width of the slit 222, bringing components with high rigidity into contact with each other reduces the variation of the width of the slit 222 at the center portion in the apparatus depth direction.

In the image reading device 100, the upward surface 248*a* of each protrusion 248 on the lower housing 240 and the downward surface 216*a* of the corresponding protrusion 216 on the upper housing 200 come into contact with each other in the height direction. Thus, the upper housing 200 and the lower housing 240 are fixed in position in the height direction. Thus, compared with the case where they are fixed in position in the height direction (light propagation direction) by using a portion different from the protrusion to correct the width of the slit 222, the shape of the lower housing 240 is simplified.

In the image reading device 100, the adhesive 270 is filled in between each protrusion 256 on the lower housing 240 and the corresponding cover 220 on the upper housing 200 to bond the upper housing 200 and the lower housing 240 to each other. The image reading device 100 with this structure thus has higher bonding strength than a structure where the ridges are bonded by being abutted against each other.

In the image reading device 100, each projection 252 of the lower housing 240 is held in between the corresponding pair of holders 218 of the upper housing 200 in the apparatus depth direction. Thus, the upper housing 200 and the lower housing 240 are fixed in position in the apparatus depth direction. Compared to a structure where the lower housing 240 is abutted against the upper housing 200 on one side in the apparatus depth direction to be fixed in position in the apparatus depth direction, the image reading device 100 with this structure facilitates positioning in the apparatus depth direction.

In the image reading device 100, the multiple recesses 244*c* are formed on the opposing surfaces 244*b* that oppose in the apparatus width direction across the through-hole 244 to form gaps between the opposing surfaces 244*b* and the adhesive 130 that bonds the pair of lens arrays 152. The image reading device 100 with this structure thus reduces detachment of the adhesive 130 as a result of the lower housing 240 and the adhesive 130 rubbing against each other due to a difference between the degree (amount of dimensional change) of expansion and contraction of the lower housing 240 and the degree (amount of dimensional change) of expansion and contraction of the pair of lens arrays 152 caused by a change of the ambient environment (particularly, temperature and humidity).

In the image reading device 100, the sealant 134 serving as an elastic member is applied along the outer peripheries of the lens arrays 152 across the upper surface of the body 242 of the lower housing 240 and the side surface of the condenser 112. The image reading device 100 thus blocks stray light that is to pass between the lens arrays 152 and the body 242 while allowing the lens arrays 152 to expand and contract in the apparatus depth direction. More specifically, the light-shielding member 150 having the through-holes 170 corresponding to the microlenses 164 of the pair of lens arrays 152 is placed on the pair of lens arrays 152 at a portion upstream in the light propagation direction. The sealant 134 formed from an elastic member is applied along the outer periphery of the first lens array 152 across the body 242, the first lens array 152 located upstream in the light propagation direction, and the light-shielding member 150. In the image reading device 100 with this structure, reflected light that has passed through the slit 222 and that has been reflected off the inner circumferential surfaces of the through-hole 210 is less likely to serve as stray light that enters the pair of lens arrays 152 from the side surface (the surface facing outward in the apparatus width direction) of the first lens array 152 located upstream in the light propagation direction. In other words, the image reading device 100 with this structure reduces reflected light that has passed through the slit 222 and that has been reflected off the surfaces defining the hole upstream portion 210*a* of the through-hole 210 (the surfaces of the pair of wall plates 208 facing inward in the apparatus width direction) to serve as stray light that enters the pair of lens arrays 152 from the side surface (the surface facing outward in the apparatus width direction), exposed to the outside from the lower housing 240, in the first lens array 152 located upstream in the light propagation direction.

Compared to the structure including an image reading device for which an upper housing formed from a resin material is directly used, the image reading unit 60 including the image reading device 100 reduces degradation of the quality of read images.

Compared to the structure including an image reading unit including an image reading device for which an upper housing formed from a resin material is directly used, the image forming apparatus 10 including the image reading unit 60 reduces degradation of the quality of output images.

Although the present disclosure is described in detail with reference to a specific exemplary embodiment, the present disclosure is not limited to the exemplary embodiment. It is apparent to those skilled in the art that the present disclosure may be embodied in various other exemplary embodiments within the scope of the present disclosure.

For example, in the image reading device 100 according to the above exemplary embodiment, at least the surfaces (the surfaces of the pair of wall plates 208 facing inward in the apparatus width direction) of the upper housing 200 defining the hole upstream portion 210*a* and irradiated with reflected light are black and embossed. Instead, the surfaces may be either black or embossed, or neither black nor embossed. More specifically, although the upper housing 200 is black in the above exemplary embodiment, the upper housing 200 may be, for example, milky white. However, this structure has no effect resulting from the upper housing 200 being black.

Although at least the inner circumferential surfaces of the upper housing 200 defining the through-hole 210 and irradiated with the reflected light reflected off the document G are embossed in the above exemplary embodiment, the surfaces may be smooth. However, this structure has no effect resulting from the surfaces being embossed.

In the above exemplary embodiment, the upward surfaces 280 facing upstream in the light propagation direction are formed at the peripheral portions of the slit 222 of the upper housing 200, and the upward surfaces 280 are embossed. Specifically, the image reading device 100 in which the upward surfaces 280 are black and embossed is described. Instead, the upward surfaces 280 may be either black or embossed, or neither black nor embossed. However, the structure where the upward surfaces 280 are, for example, milky white has no effect resulting from the upward surfaces 280 being black. In addition, the structure where the upward surfaces 280 are, for example, smooth has no effect resulting from the upward surfaces 280 being embossed.

In the above exemplary embodiment, the outward surface 248*b* of each protrusion 248 on the lower housing 240 and the inward surface 216*b* of the corresponding protrusion 216 on the upper housing 200 come into contact with each other in the apparatus width direction to correct the width of the slit 222. Instead, flat surfaces may be brought into contact with each other to correct the width of the slit 222. However, this structure has no effect resulting from the protrusion 248 and the protrusion 216 being brought into contact with each other to correct the width of the slit 222.

In the above exemplary embodiment, each projection 252 on the lower housing 240 is held in between the pair of holders 218 of the upper housing 200 in the apparatus depth direction to fix the positions of the upper housing 200 and the lower housing 240 in the apparatus depth direction. Instead, the lower housing may be abutted against the upper housing on one side in the apparatus depth direction to fix the positions in the apparatus depth direction. However, this structure has no effect resulting from the projection 252 being held in between the pair of holders 218 to be fixed in position.

In the above exemplary embodiment, the image reading device 100 is described as an example of an optical device. Instead, another optical device other than an image reading device may be used.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

An optical device, comprising:

a restriction member that restricts part of reflected light from a target object, the restriction member being formed from resin, the restriction member having an opening and a hole, the opening extending in a first direction crossing a propagation direction of the reflected light and formed at an upstream end in the propagation direction, the hole extending through the restriction member in the propagation direction;

an optical member that transmits the reflected light that has passed through the opening; and a correction member that comes into contact with part of an inner circumferential surface of the hole to correct a width of the opening.

(((2)))

The optical device according to (((1))), wherein, of the restriction member, at least a portion irradiated with the reflected light is black.

(((3)))

The optical device according to (((1))) or (((2))), wherein, of the restriction member, at least a portion irradiated with the reflected light is embossed (((4)))

The optical device according to any one of (((1))) to (((3))), wherein the correction member includes a body that holds the optical member in a width direction crossing the first direction and the propagation direction, and the body has an outer peripheral surface that faces outward in the width direction and from which a plurality of first protrusions protrude outward in the width direction, and wherein the inner circumferential surface of the restriction member has a plurality of second protrusions that protrude inward in the width direction and that come into contact with the first protrusions in the width direction.

(((5)))

The optical device according to (((4))), wherein each of the plurality of first protrusions has a first surface facing upstream in the propagation direction, and wherein each of the plurality of second protrusions has a second surface that comes into contact with the first surface in the propagation direction.

(((6)))

The optical device according to any one of (((1))) to (((5))), wherein the correction member includes a body that holds the optical member in between in a width direction crossing the first direction and the propagation direction, and the body has an outer peripheral surface that faces outward in the width direction, and from which a plurality of protrusions protrude outward in the width direction, wherein the restriction member includes a plurality of covers that cover the protrusions from an outer side of the width direction and in the first direction, and wherein an adhesive is filled in between the protrusions and the covers.

(((7)))

The optical device according to any one of (((1))) to (((6))), wherein the correction member includes a body that holds the optical member in between in a width direction crossing the first direction and the propagation direction, and the body has an outer peripheral surface that faces outward in the width direction, and from which a projection protrudes at a center portion in the first direction, and wherein the restriction member includes a pair of holders that hold the projection in the first direction.

(((8)))

The optical device according to any one of (((1))) to (((7))), wherein the optical member includes a pair of lens arrays overlapping each other in the propagation direction, wherein a second adhesive is applied to the pair of lens arrays from an outer side in a width direction crossing the first direction and the propagation direction at a plurality of portions across the pair of lens arrays, and wherein the correction member includes a body that holds the optical member in between in the width direction crossing the first direction and the propagation direction and that extends in the first direction, and the body has opposing surfaces that oppose the pair of lens arrays and on which a plurality of recesses are formed to define gaps between the opposing surfaces and the second adhesive.

(((9)))

The optical device according to (((8))), wherein a sealant formed from an elastic member is applied along outer peripheries of the lens arrays across the body and the lens arrays.

(((10)))

An image reading unit, comprising:

the optical device according to any one of (((1))) to (((9))); and a glass plate that receives a document having an image that is to be read by the optical device.

(((11)))

An image forming apparatus, comprising:

the image reading unit according to (((10))); and a transfer device that transfers an image read by the optical device of the image reading unit to a recording medium.

What is claimed is:

1. An optical device comprising:

an upper housing that restricts part of reflected light from a target object, wherein the upper housing comprises resin, and wherein the upper housing has a slit and a hole, the slit extending in a first direction crossing a propagation direction of the reflected light and formed at an upstream end in the propagation direction, the hole extending through the upper housing in the propagation direction;

at least one lens array configured to transmit the reflected light that has passed through the slit; and a lower housing that holds the at least one lens array, and that is configured to contact with part of an inner circumferential surface of the hole to correct a width of the slit, wherein the lower housing includes a body that holds the at least one lens array in a width direction crossing the first direction and the propagation direction, and the body has an outer peripheral surface that faces outward in the width direction and from which a plurality of first protrusions protrude outward in the width direction, and wherein the inner circumferential surface of the upper housing has a plurality of second protrusions that protrude inward in the width direction and that come into contact with the first protrusions in the width direction.

2. The optical device according to claim 1, wherein, of the inner circumferential surface of the hole of the upper housing, at least a portion irradiated with the reflected light is black or embossed.

3. The optical device according to claim 2, wherein an upward surface facing upstream in the propagation direction is formed at a peripheral portion of the slit of the upper housing, and wherein the upward surface is black or embossed.

4. The optical device according to claim 1. wherein each of the plurality of first protrusions has a first surface facing upstream in the propagation direction, and wherein each of the plurality of second protrusions has a second surface that is configured to contact with the first surface in the propagation direction.

5. The optical device according to claim 1, wherein the upper housing houses a pair of wall plates, which are spaced apart, and which define the hole.

6. An optical device comprising:

an upper housing that restricts part of reflected light from a target object, wherein the upper housing comprises resin, and wherein the upper housing has a slit and a hole, the slit extending in a first direction crossing a propagation direction of the reflected light and formed at an upstream end in the propagation direction, the hole extending through the upper housing in the propagation direction;

at least one lens array configured to transmit the reflected light that has passed through the slit; and a lower housing that holds the at least one lens array, and that is configured to contact with part of an inner circumferential surface of the hole to correct a width of the slit, wherein the lower housing includes a body that holds the at least one lens array in between in a width direction crossing the first direction and the propagation direction, and the body has an outer peripheral surface that faces outward in the width direction, and from which a plurality of projections protrude outward in the width direction, wherein the upper housing includes a plurality of covers that cover the projections from an outer side of the width direction and in the first direction, and wherein an adhesive is filled in between the projections and the covers.

7. An optical device comprising:

an upper housing that restricts part of reflected light from a target object, wherein the upper housing comprises resin, and wherein the upper housing has a slit and a hole, the slit extending in a first direction crossing a propagation direction of the reflected light and formed at an upstream end in the propagation direction, the hole extending through the upper housing in the propagation direction;

at least one lens array configured to transmit the reflected light that has passed through the slit; and a lower housing that holds the at least one lens array, and that is configured to contact with part of an inner circumferential surface of the hole to correct a width of the slit, wherein the lower housing includes a body that holds the at least one lens array in between in a width direction crossing the first direction and the propagation direction, and the body has an outer peripheral surface that faces outward in the width direction, and from which a projection protrudes at a center portion in the first direction, and wherein the upper housing includes a pair of holders that hold the projection in the first direction.

8. An optical device comprising:

an upper housing that restricts part of reflected light from a target object, wherein the upper housing comprises resin, and wherein the upper housing has a slit and a hole, the slit extending in a first direction crossing a propagation direction of the reflected light and formed at an upstream end in the propagation direction, the hole extending through the upper housing in the propagation direction;

at least one lens array configured to transmit the reflected light that has passed through the slit; and a lower housing that holds the at least one lens array, and that is configured to contact with part of an inner circumferential surface of the hole to correct a width of the slit, wherein the at least one lens array includes a pair of lens arrays overlapping each other in the propagation direction, wherein a second adhesive is applied to the pair of lens arrays from an outer side in a width direction crossing the first direction and the propagation direction at a plurality of portions across the pair of lens arrays, and wherein the lower housing includes a body that holds the at least one lens array in between in the width direction and that extends in the first direction, and the body has opposing surfaces that oppose the pair of lens arrays and on which a plurality of recesses are formed to define gaps between the opposing surfaces and the second adhesive.

9. The optical device according to claim 8, wherein a sealant formed from an elastic member is applied along outer peripheries of the lens arrays across the body and the lens arrays.

10. An image reading unit, comprising:

the optical device according to claim 1; and a glass plate configured to receive a document having an image that is to be read by the optical device.

11. An image reading unit, comprising:

the optical device according to claim 2; and a glass plate configured to receive a document having an image that is to be read by the optical device.

12. An image reading unit, comprising:

the optical device according to claim 3; and a glass plate configured to receive a document having an image that is to be read by the optical device.

13. An image reading unit, comprising:

the optical device according to claim 4; and a glass plate configured to receive a document having an image that is to be read by the optical device.

14. An image reading unit, comprising:

the optical device according to claim 6; and a glass plate configured to receive a document having an image that is to be read by the optical device.

15. An image reading unit, comprising:

the optical device according to claim 7; and a glass plate configured to receive a document having an image that is to be read by the optical device.

16. An image reading unit, comprising:

the optical device according to claim 8; and a glass plate configured to receive a document having an image that is to be read by the optical device.

17. An image reading unit, comprising:

the optical device according to claim 9; and a glass plate configured to receive a document having an image that is to be read by the optical device.

18. An image forming apparatus, comprising:

the image reading unit according to claim 10; and a transfer device configured to transfer an image read by the optical device of the image reading unit to a recording medium.

19. An image forming apparatus, comprising:

the image reading unit according to claim 11; and a transfer device configured to transfer an image read by the optical device of the image reading unit to a recording medium.

* * * * *